Figure 1:
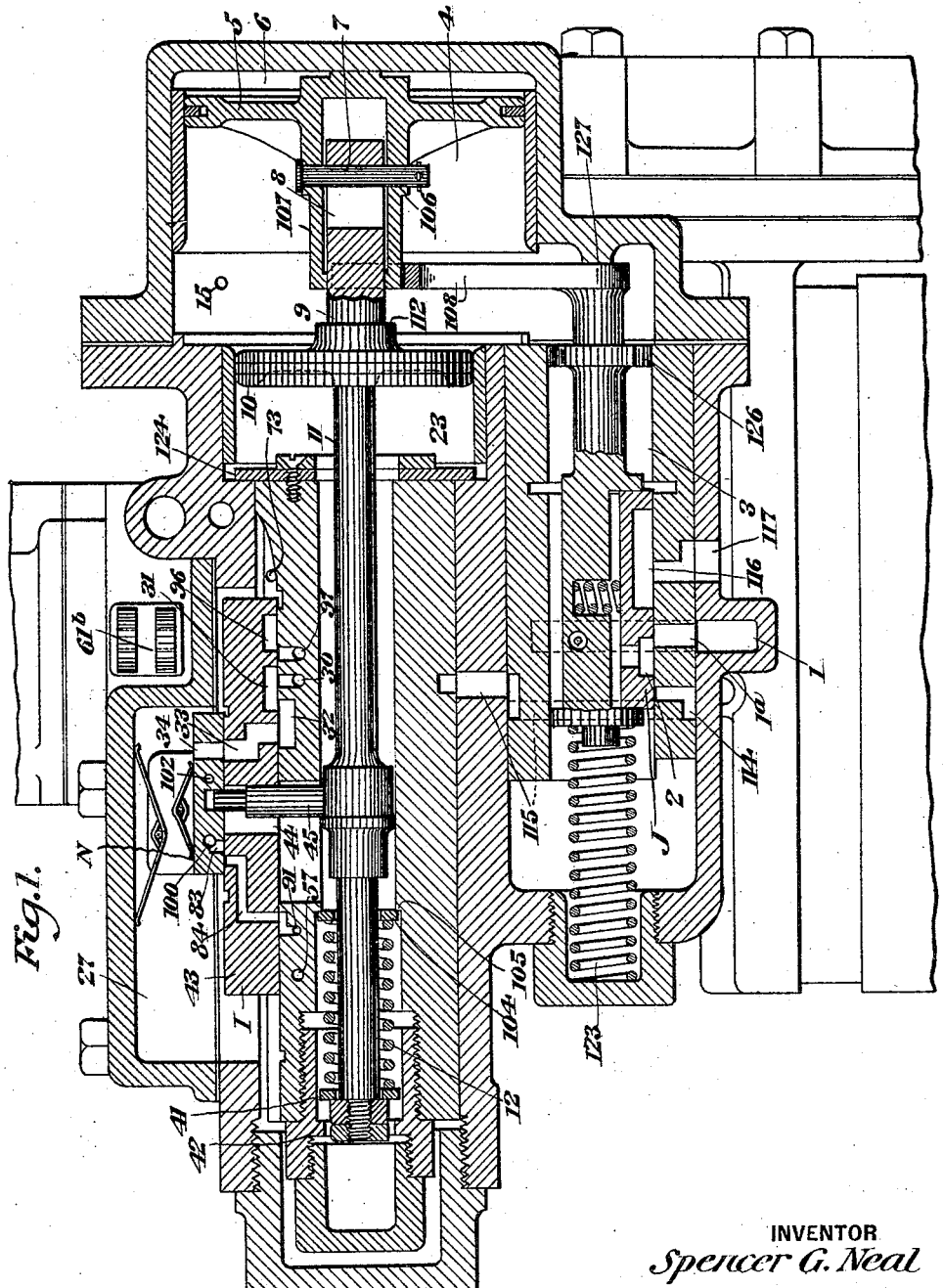

S. G. NEAL.
AIR BRAKE APPARATUS.
APPLICATION FILED APR. 19, 1920.

1,418,961.

Patented June 6, 1922.
16 SHEETS—SHEET 3.

INVENTOR
Spencer G. Neal

BY
*Davis Davis*
ATTORNEYS

Inventor
Spencer G. Neal
By his Attorneys

Inventor
Spencer G. Neal
By his Attorneys

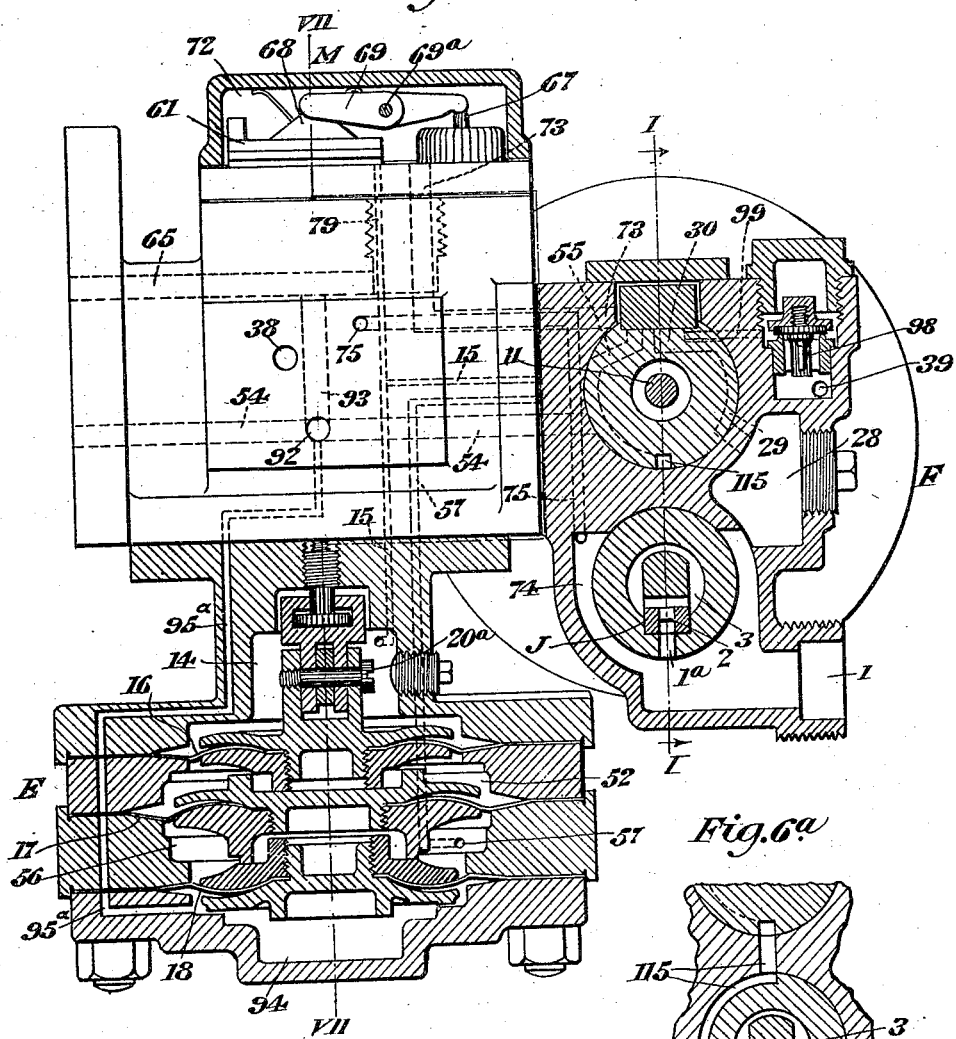

S. G. NEAL.
AIR BRAKE APPARATUS.
APPLICATION FILED APR. 19, 1920.
1,418,961.
Patented June 6, 1922.
16 SHEETS—SHEET 7.
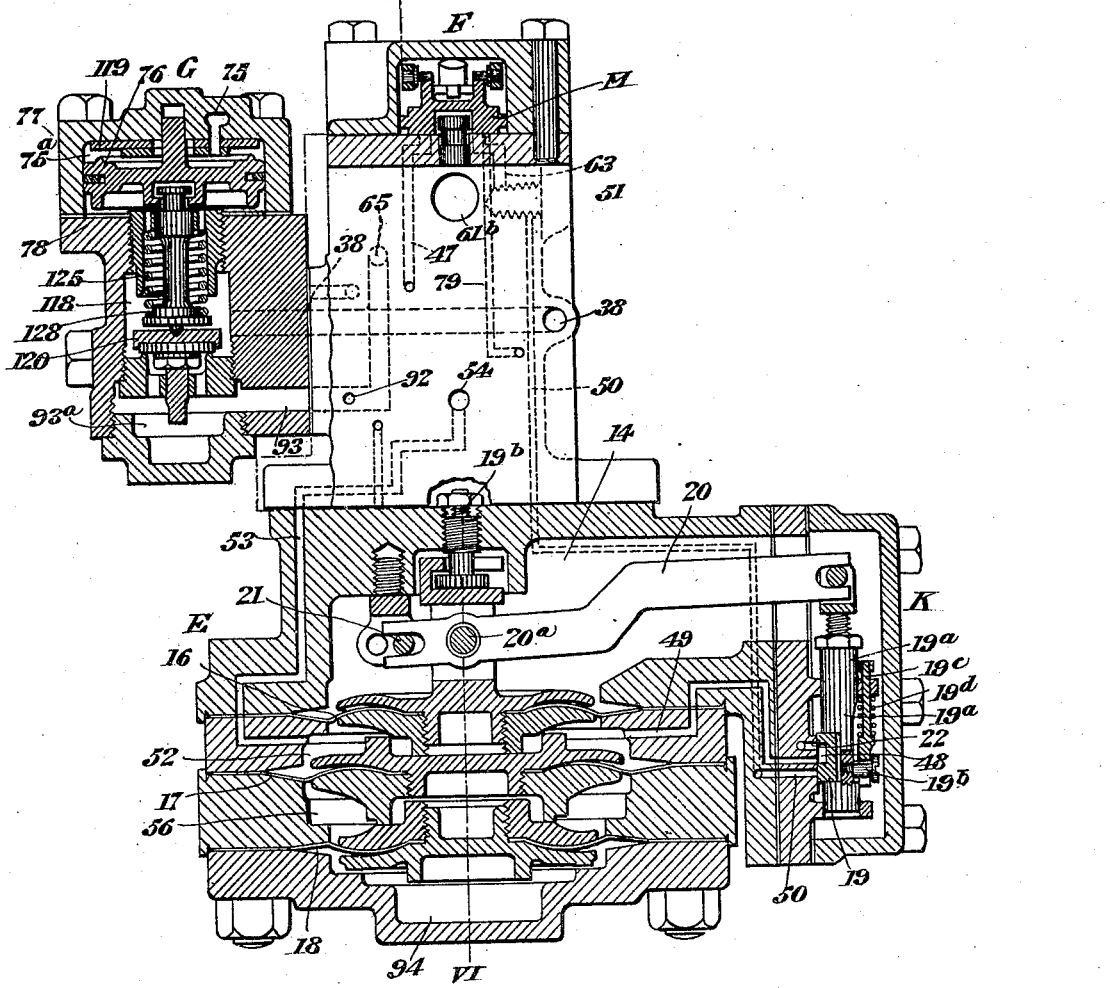

S. G. NEAL.
AIR BRAKE APPARATUS.
APPLICATION FILED APR. 19, 1920.
1,418,961.
Patented June 6, 1922.
16 SHEETS—SHEET 8.
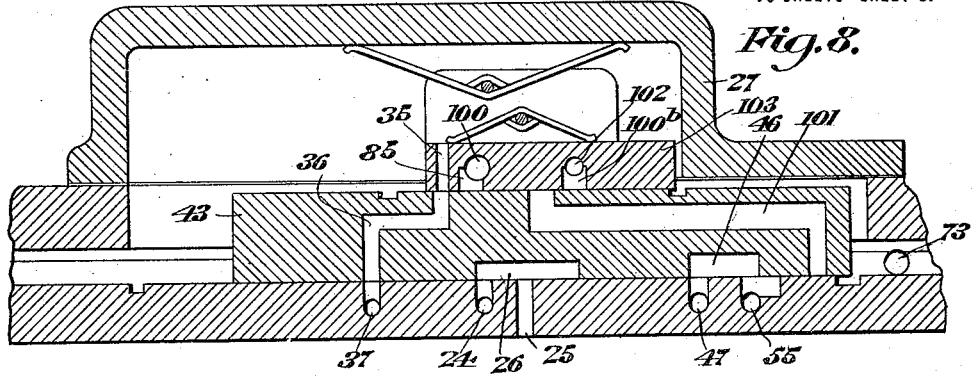
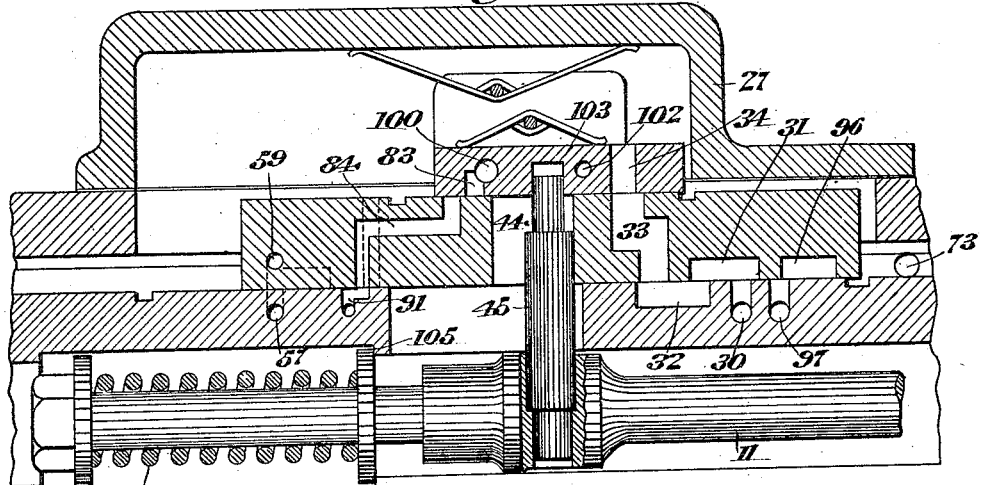
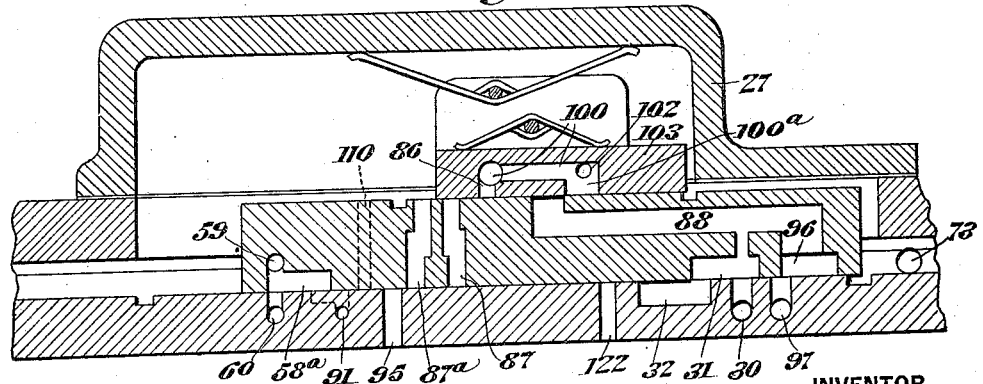
Brake Pipe Reservoir Charging Position
INVENTOR
Spencer G. Neal
BY
ATTORNEYS.

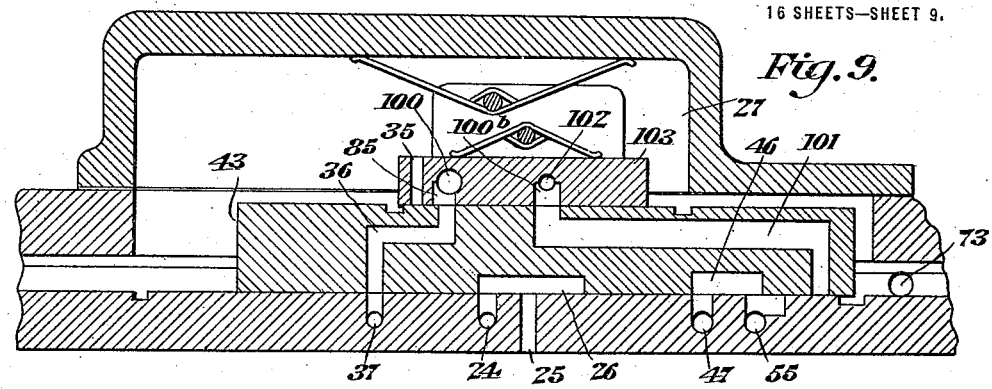
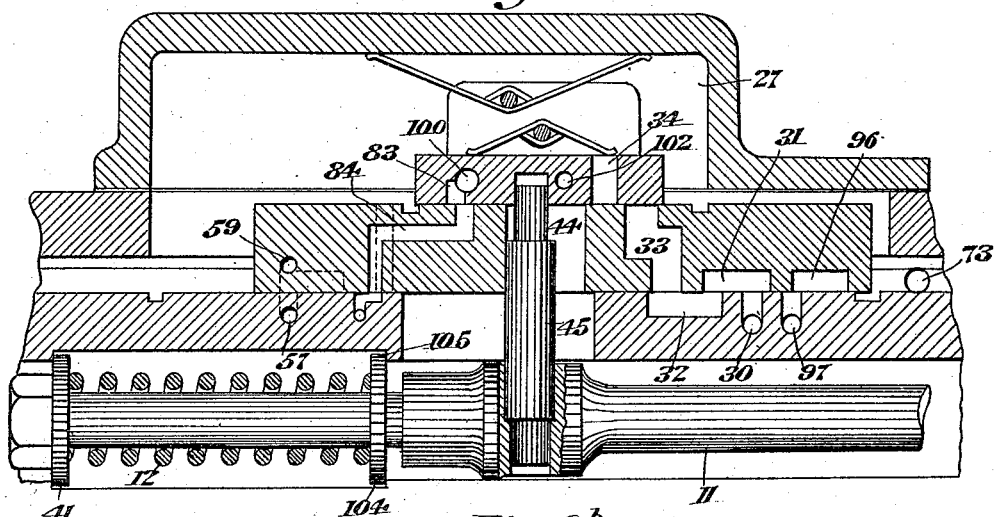
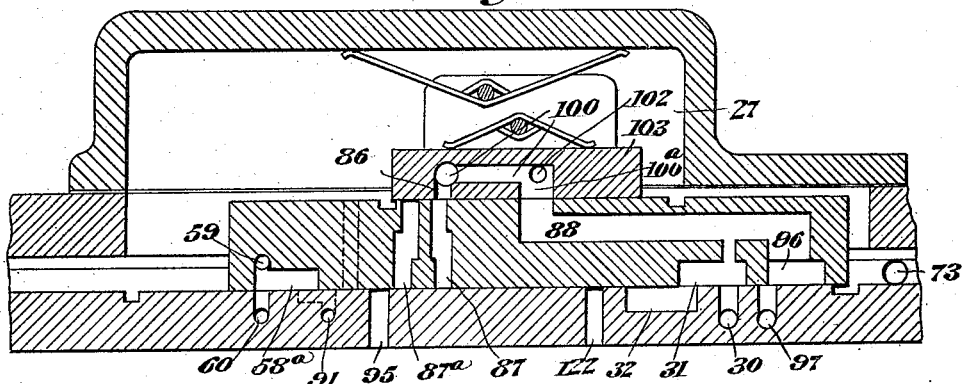
Emergency Reservoir Charging Position

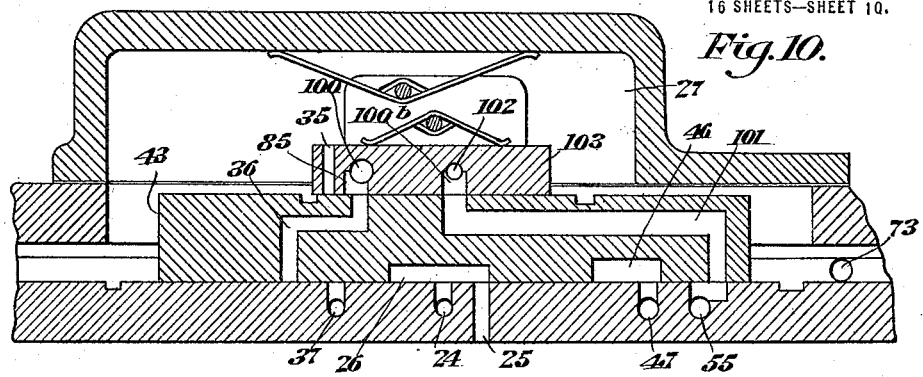
Fig. 10.
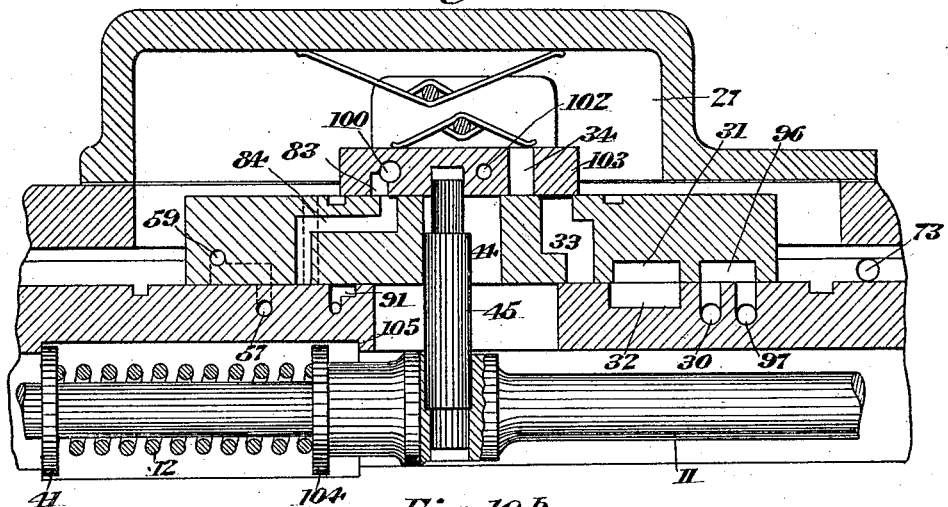
Fig. 10.ᵃ
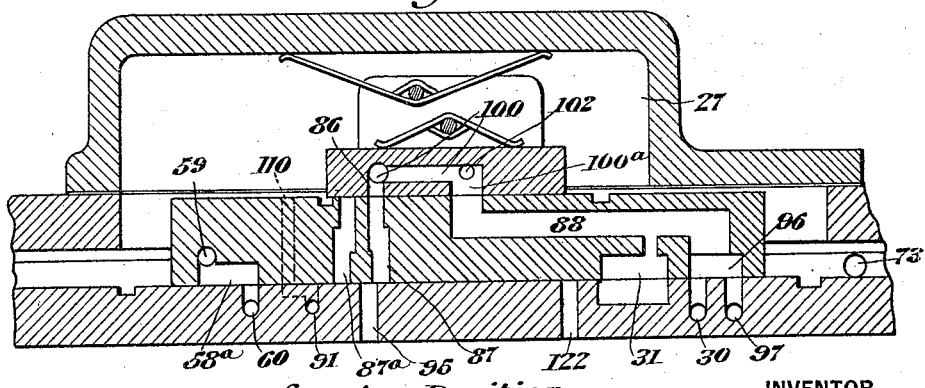
Fig. 10.ᵇ
Service Position
INVENTOR
Spencer G. Neal
BY
ATTORNEYS S. G. NEAL.
AIR BRAKE APPARATUS.
APPLICATION FILED APR. 19, 1920.
1,418,961.
Patented June 6, 1922.
16 SHEETS—SHEET 11.
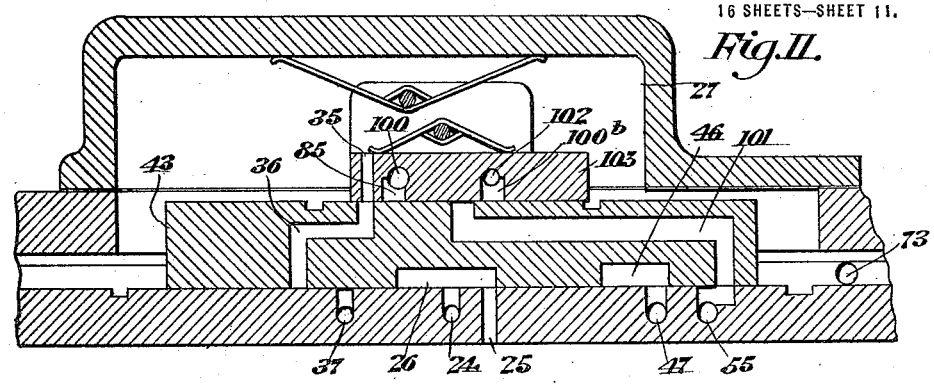
Fig. II.
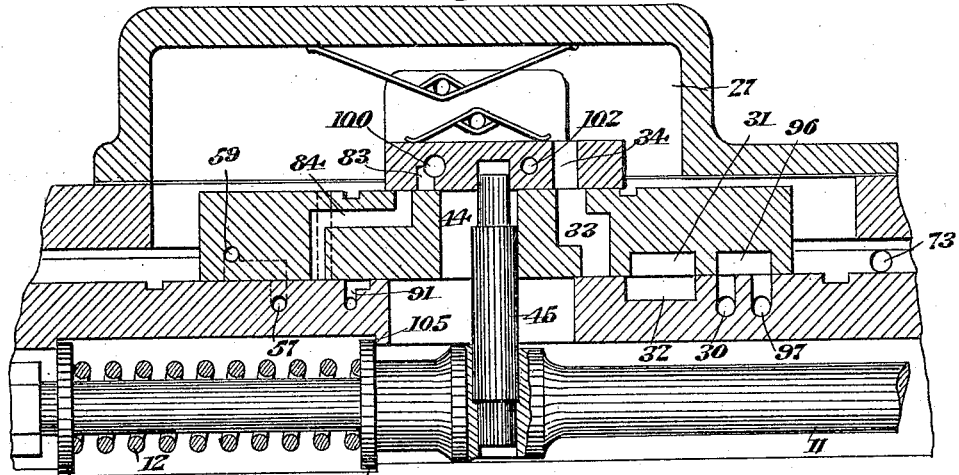
Fig. II.ᵃ
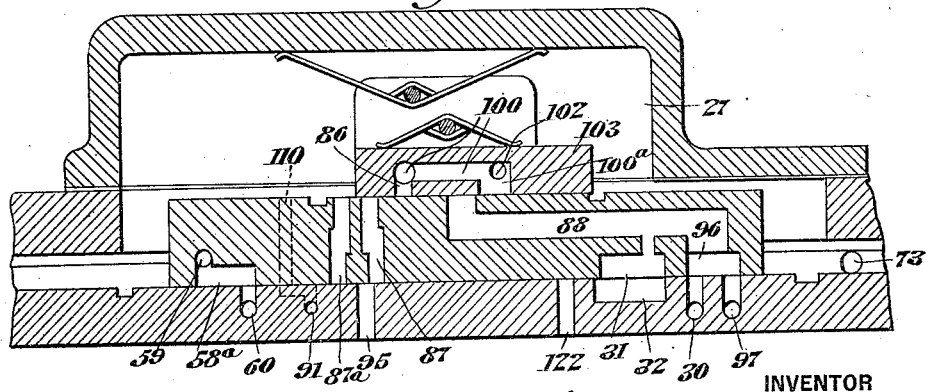
Fig. II.ᵇ
Service Lap Position
INVENTOR
Spencer G. Neal
BY
ATTORNEY

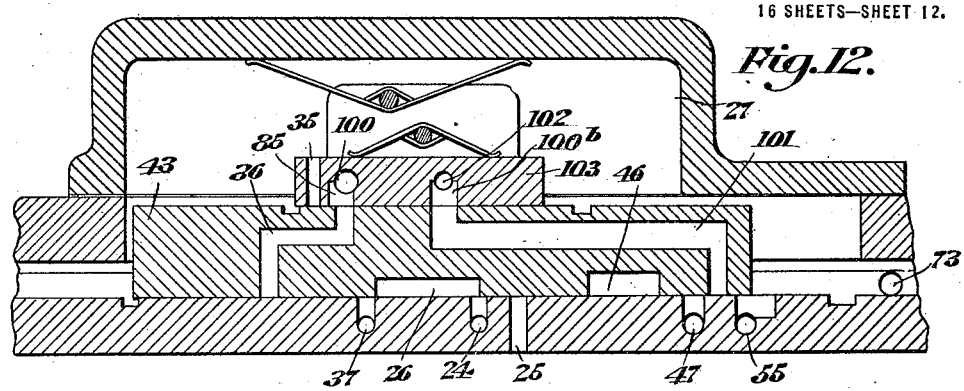
Fig. 12.
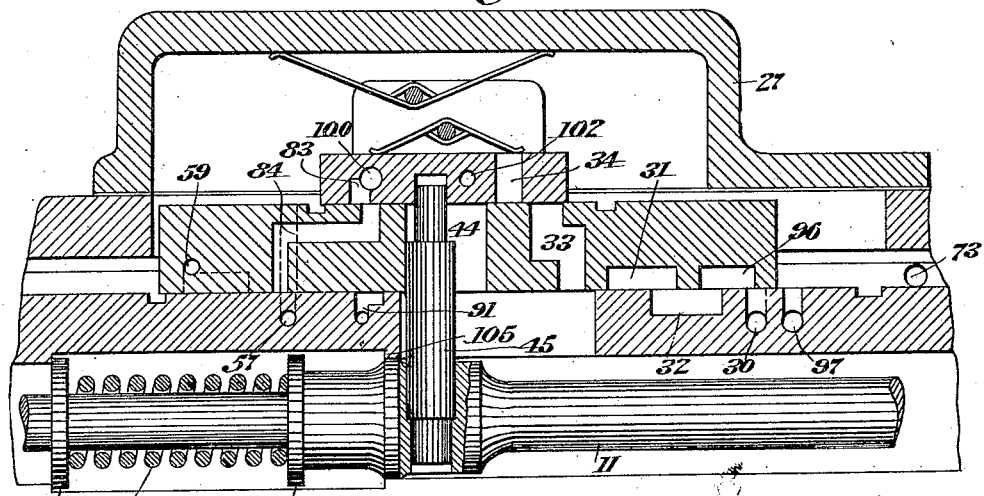
Fig. 12ᵃ
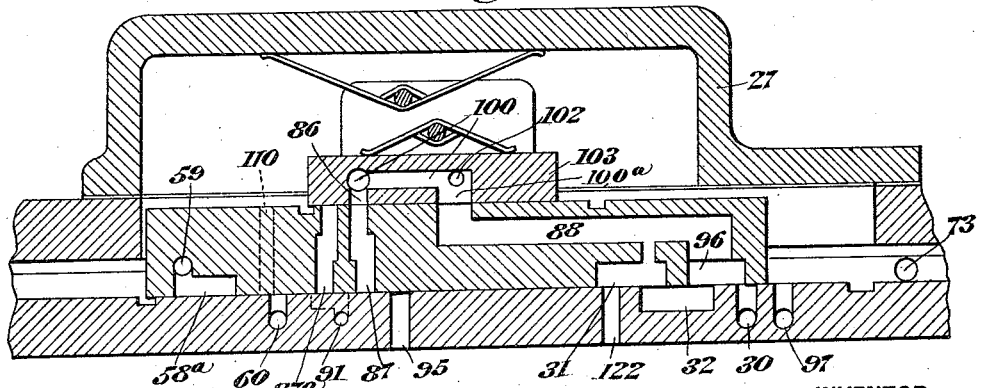
Fig. 12ᵇ
Emergency Position
INVENTOR
Spencer G. Neal
BY
ATTORNEY

S. G. NEAL.
AIR BRAKE APPARATUS.
APPLICATION FILED APR. 19, 1920.

1,418,961.

Patented June 6, 1922.
16 SHEETS—SHEET 13.

INVENTOR
Spencer G. Neal
BY
ATTORNEYS

S. G. NEAL.
AIR BRAKE APPARATUS.
APPLICATION FILED APR. 19, 1920.

1,418,961.

Patented June 6, 1922.
16 SHEETS—SHEET 14.

Quick Release Position

INVENTOR
Spencer G. Neal
BY
ATTORNEY

S. G. NEAL.
AIR BRAKE APPARATUS.
APPLICATION FILED APR. 19, 1920.
1,418,961.
Patented June 6, 1922.
16 SHEETS—SHEET 15.
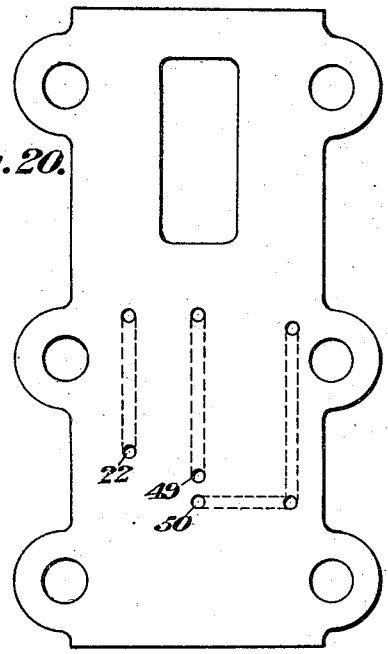
Fig. 20.
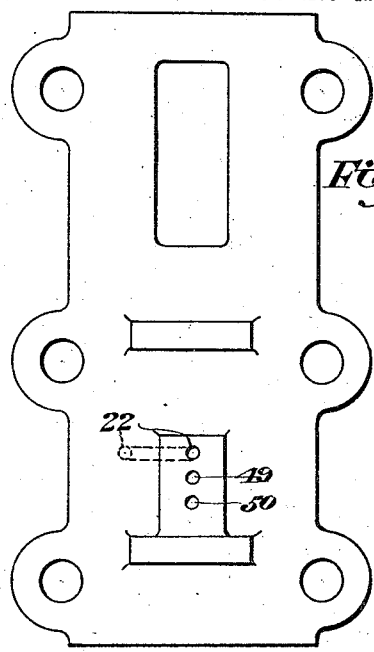
Fig. 21.
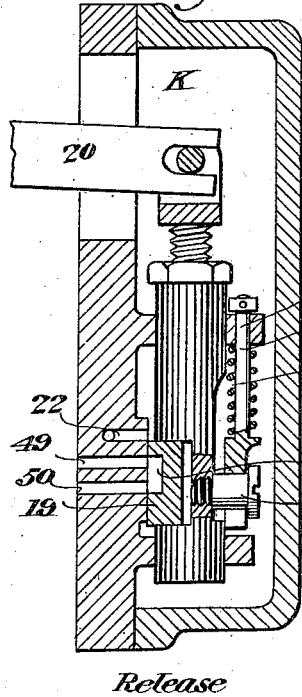
Fig. 22.
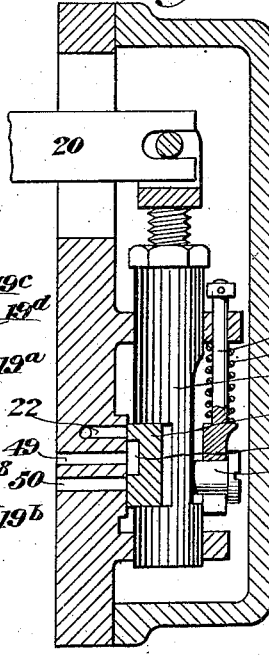
Fig. 23.
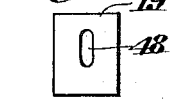
Fig. 23.ª
Release    Lap
INVENTOR
Spencer G. Neal
BY
ATTORNEY

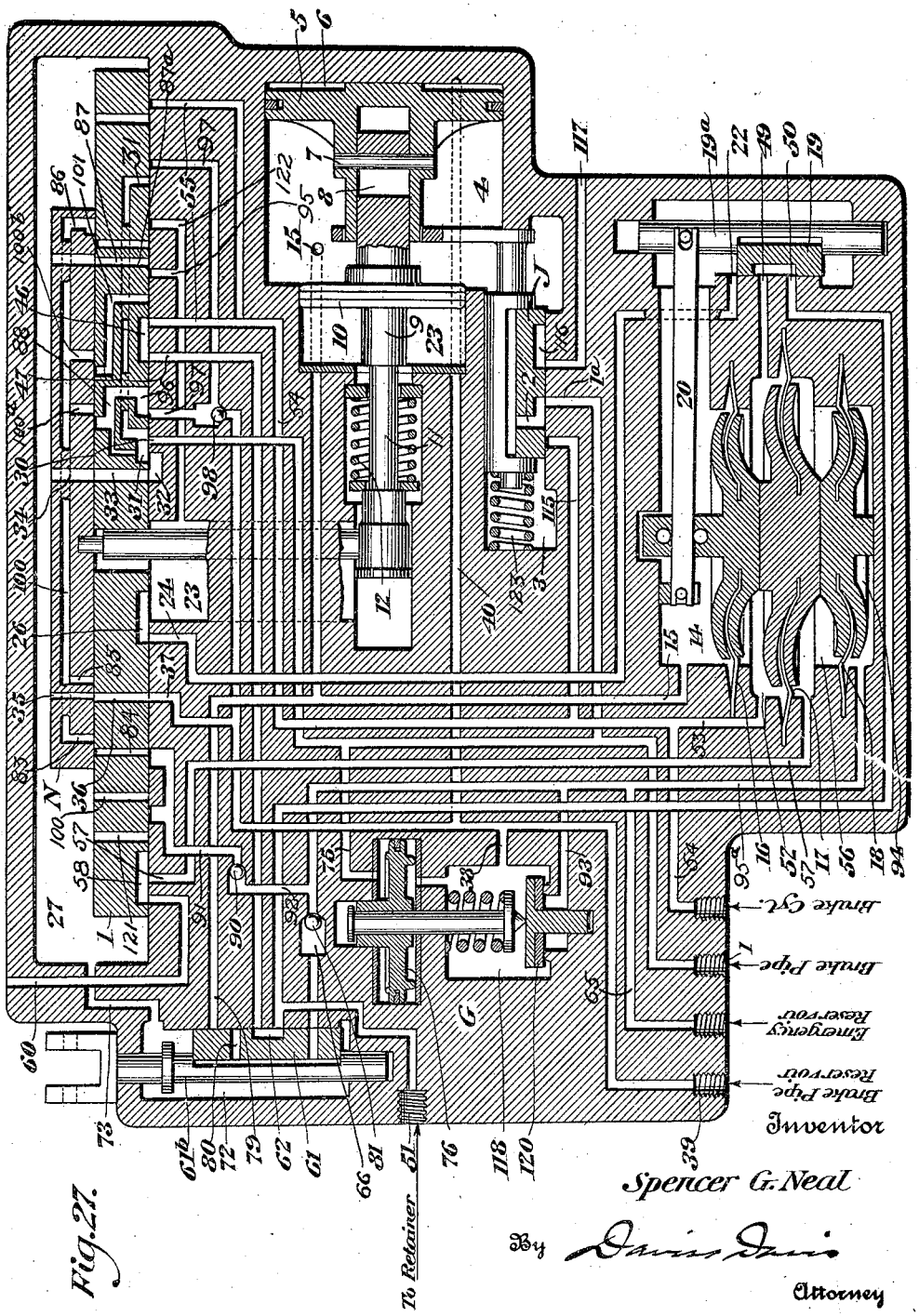

UNITED STATES PATENT OFFICE.

SPENCER GEARY NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

1,418,961. Specification of Letters Patent. Patented June 6, 1922.

Application filed April 19, 1920. Serial No. 375,063.

*To all whom it may concern:*

Be it known that I, SPENCER G. NEAL, a citizen of the United States, and resident of the borough of Manhattan, city, county, and State of New York, have invented certain new and useful Improvements in Air-Brake Apparatus (Case No. 37), of which the following is a specification.

This invention relates to improvements in that type of air brake apparatus disclosed in my Patent No. 1,411,368, April 4, 1922, wherein brake pipe and brake pipe reservoir air is used for all service applications of the brakes, an emergency reservoir supplying air for emergency applications of the brakes. In the apparatus disclosed in said application the brake pipe volume is augmented by the brake pipe reservoir, air from said reservoir passing to the brake cylinder with the air from the brake pipe during all service applications of the brakes. It is further characteristic of the apparatus disclosed in said application that the brake cylinder pressure controls the final movement of the triple valve to lap position so that the brake cylinder pressure will be always built up to the desired degree, without regard to the length of piston travel or brake cylinder leaks.

The main object of this invention is to simplify and improve the construction of the apparatus disclosed in my aforesaid pending application.

Another object of the invention is to simplify and improve the automatic emergency pilot valve and to simplify and improve the release governing valve.

A further object of the invention is to simplify and improve the means for obtaining an emergency application of the brakes.

There are other important objects and advantages of the invention which will appear hereinafter.

Figure 2:
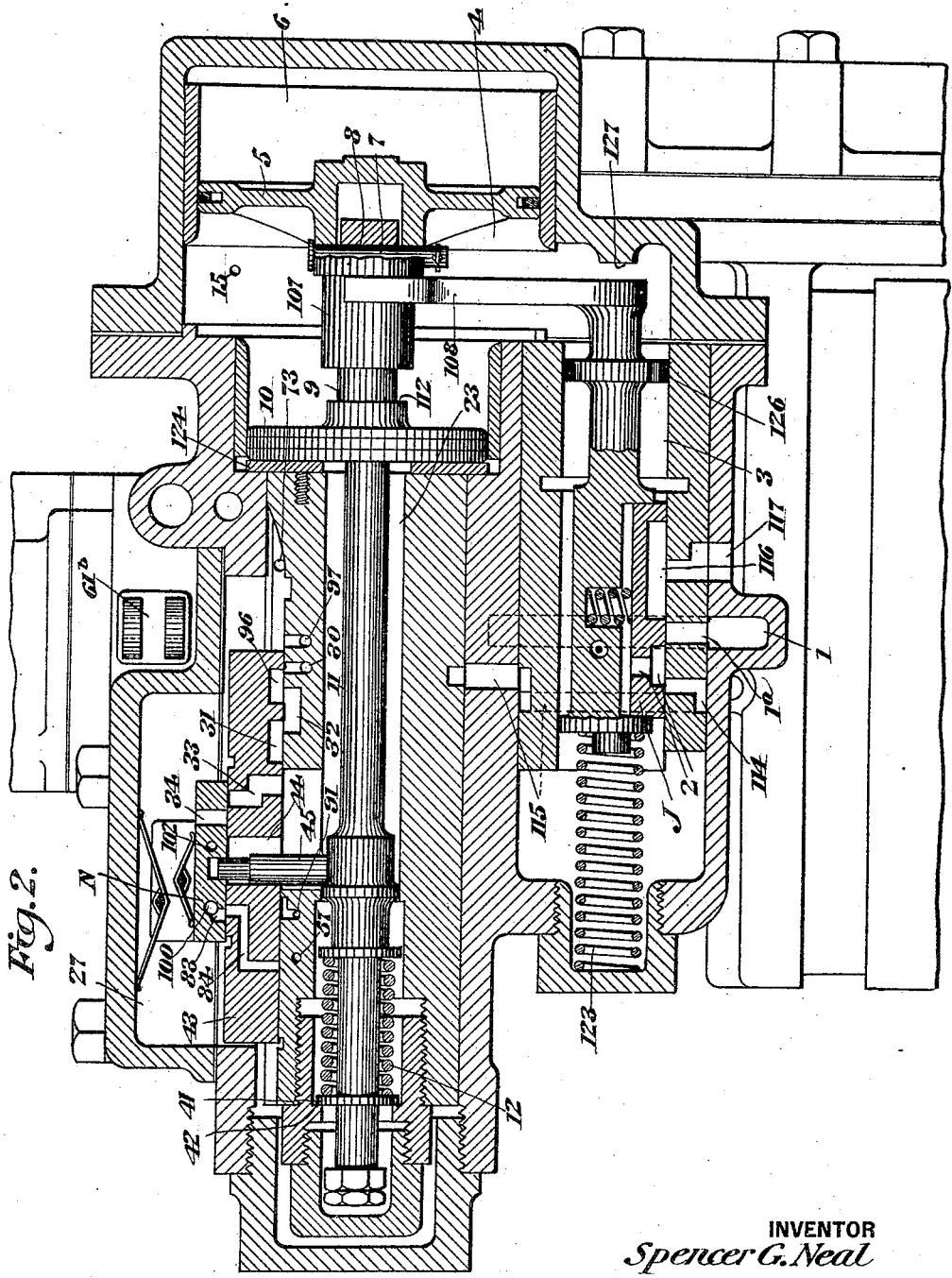
Figure 3:
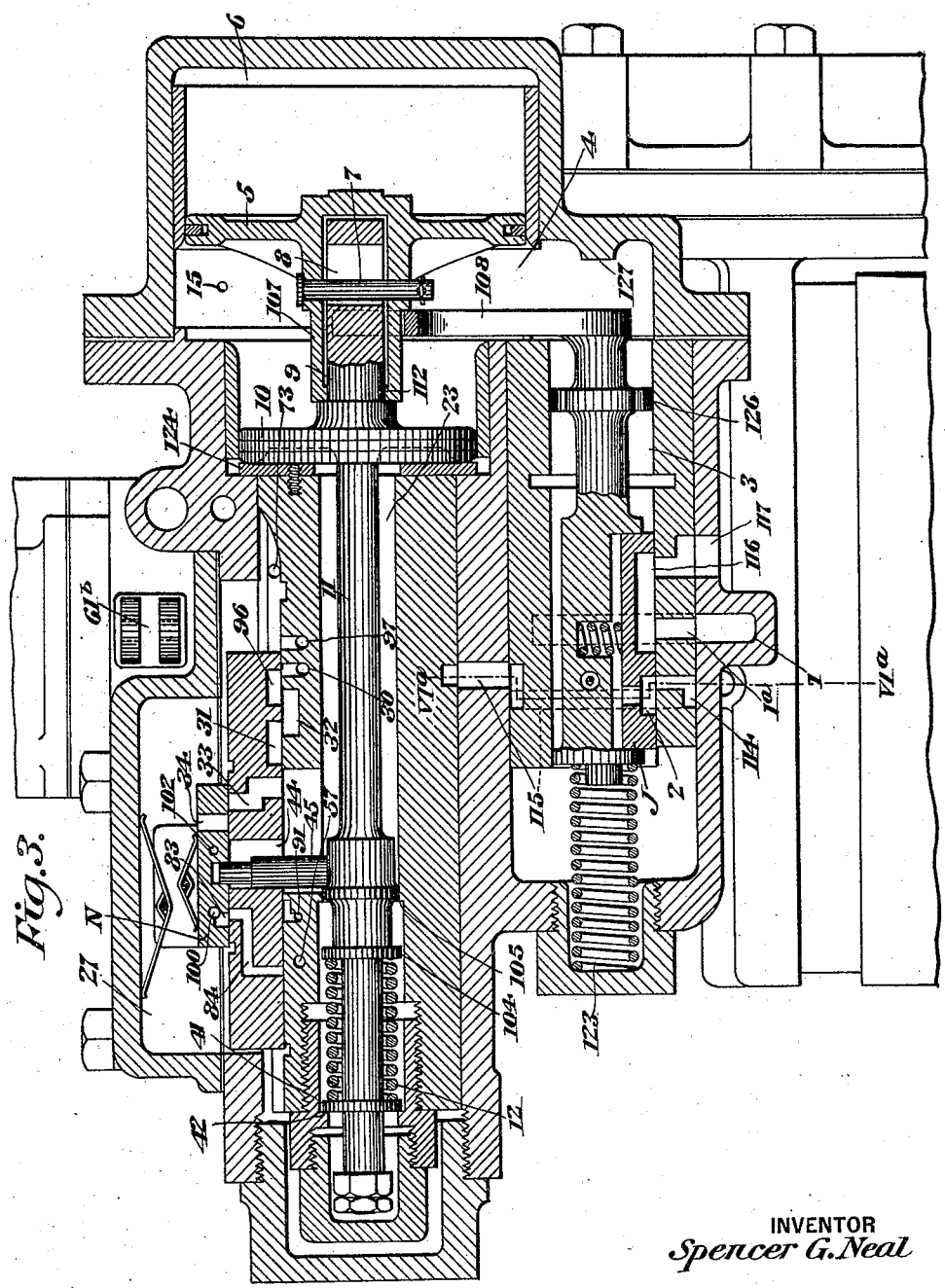
Figure 4:
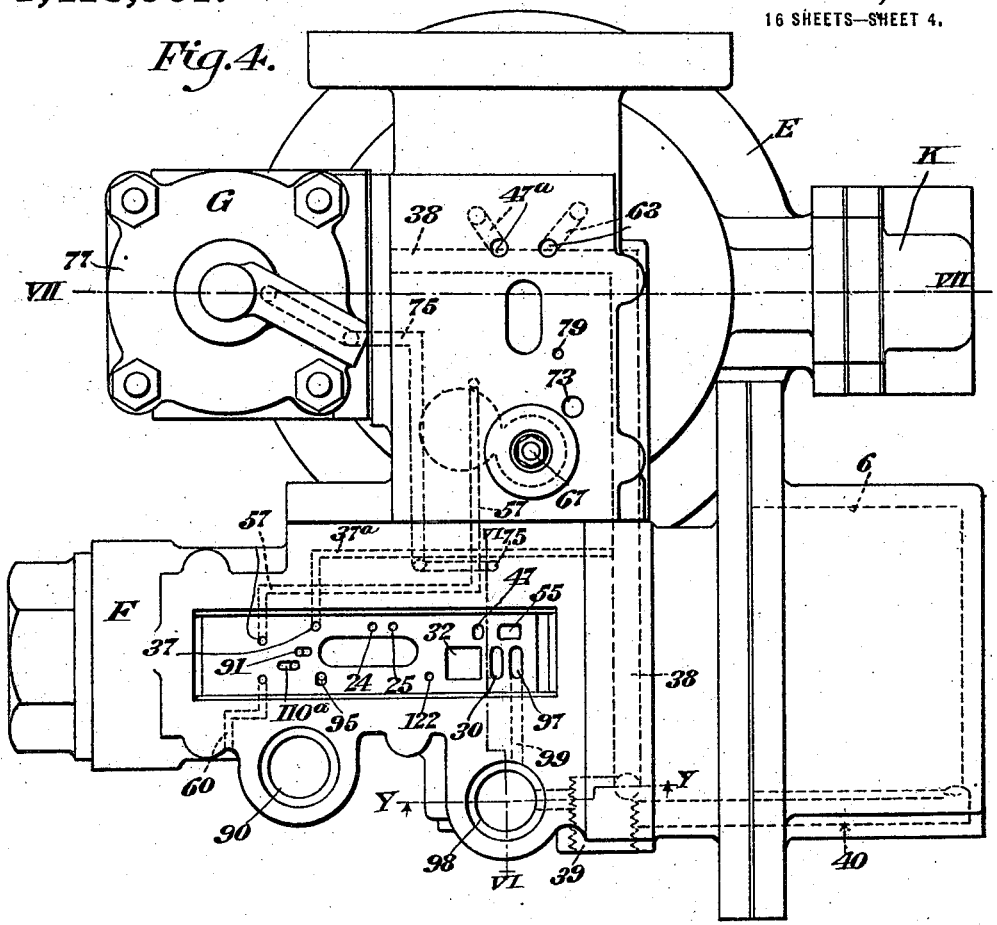
Figure 5:
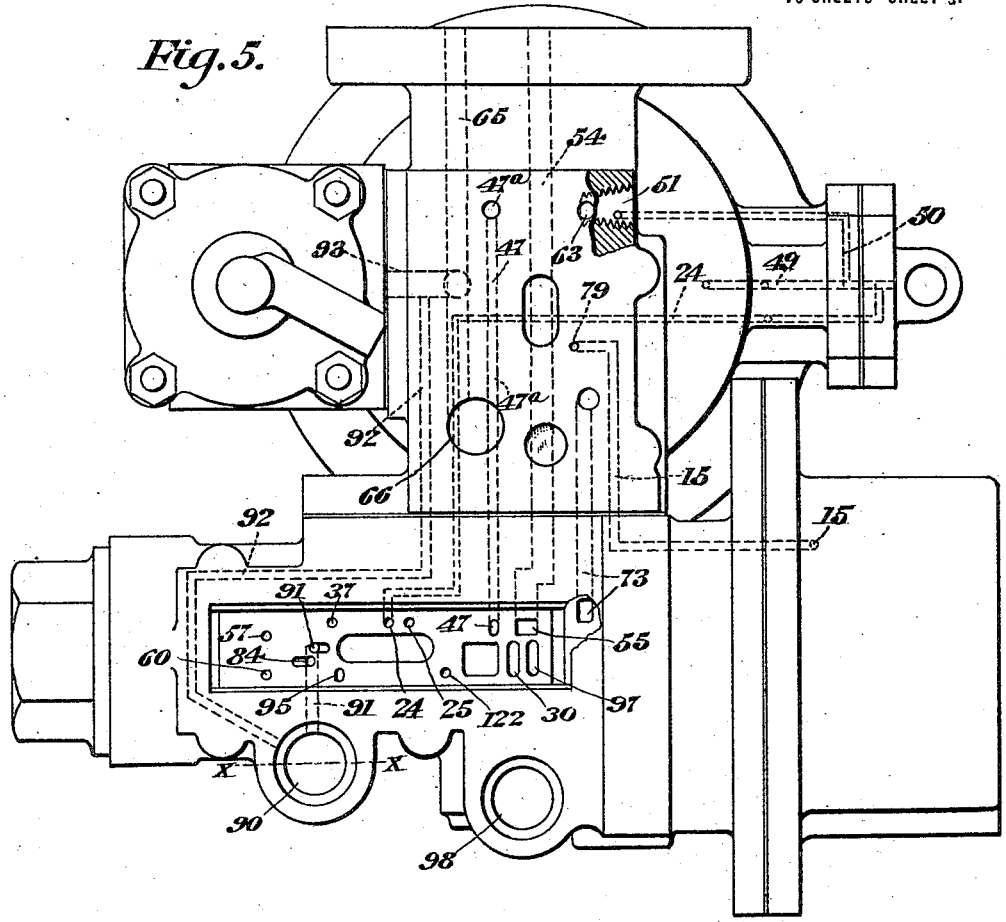

In the drawings:

Fig. 1 is a vertical longitudinal sectional view of the triple valve taken on the line I—I of Fig. 6 with the parts in full release and brake pipe reservoir charging position;

Fig. 2 a similar view with the parts in emergency lap position;

Fig. 3 a similar view showing the parts in emergency application position;

Fig. 4 a plan view of the triple valve the slide valve housings and slide valves being removed to show the valve seats and some of the ports and passages;

Fig. 5 a view similar to Fig. 4 showing other ports and passages;

Fig. 6 a vertical transverse irregular sectional view of the triple valve taken substantially on the line VI—VI of Fig. 7, the section of the main slide valve and emergency valve being taken on the line VI—VI of Fig. 4;

Fig. 6$^a$ a sectional view taken on the line VI$^a$—VI$^a$ of Fig. 3, showing the emergency valve in emergency position;

Fig. 7 an irregular vertical sectional view taken on the line VII—VII of Figs. 4 and 6;

Figs. 8, 8$^a$ and 8$^b$ sectional views of the main slide valve, the graduating valve and the main slide valve seat taken on the lines X, A and B of Figs. 13, 14, 15 and 16, showing the valves in brake pipe reservoir charging position.

Figure 26:
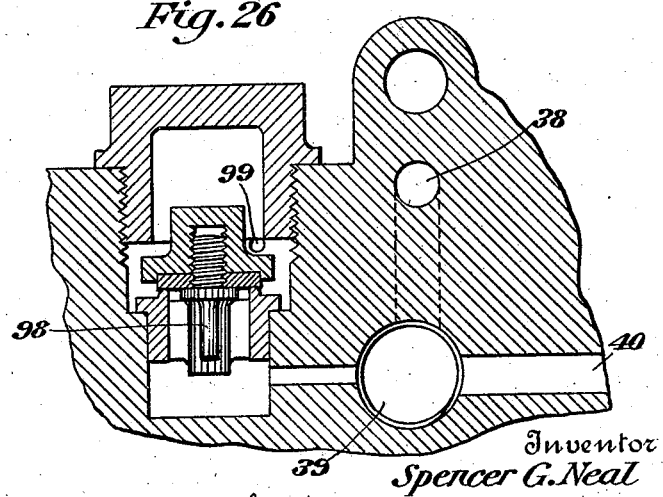
Figure 24:
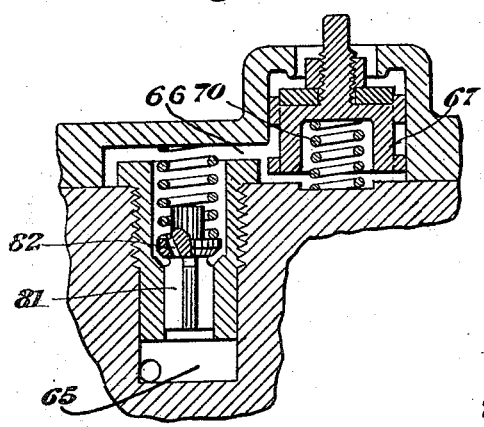
Figure 25:
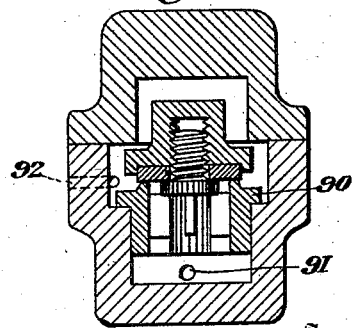
Figure 13:
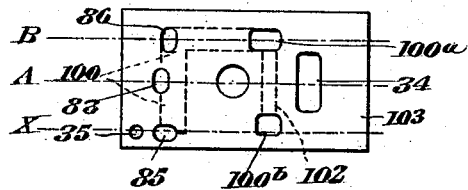
Figure 14:
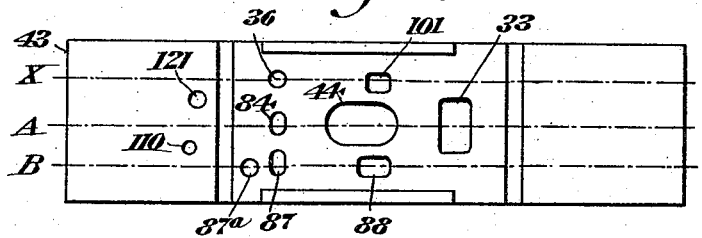
Figure 15:
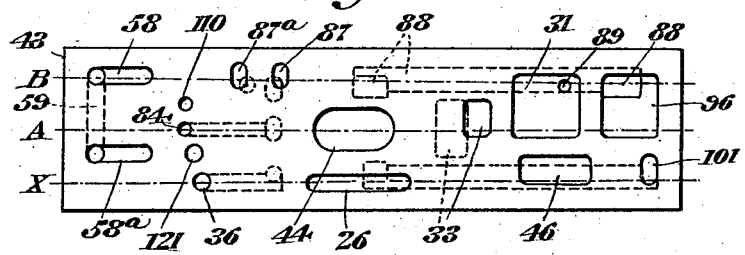
Figure 16:
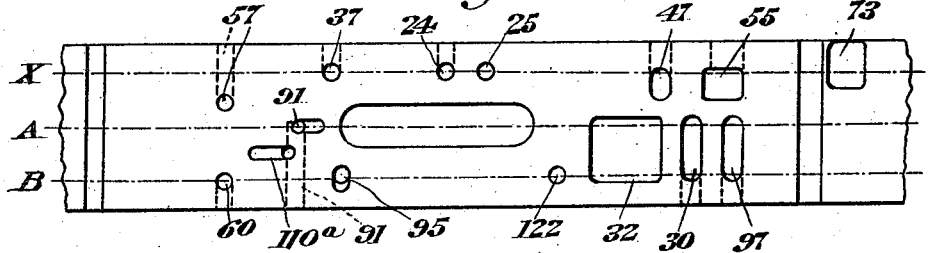
Figure 17:
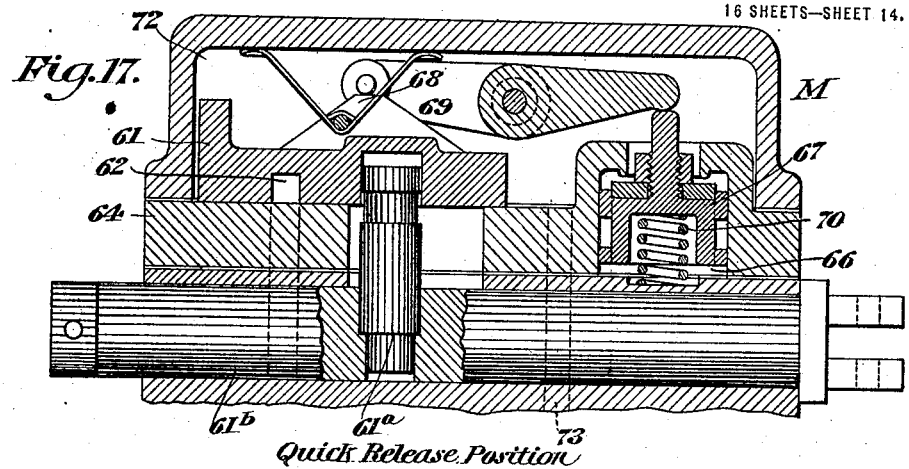
Figure 18:
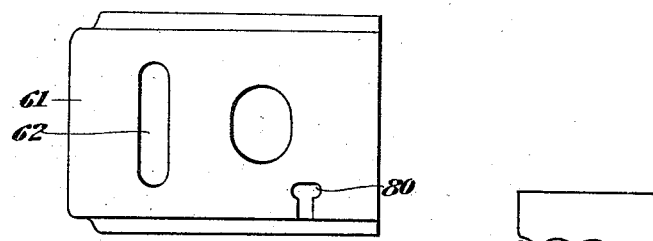
Figure 19:
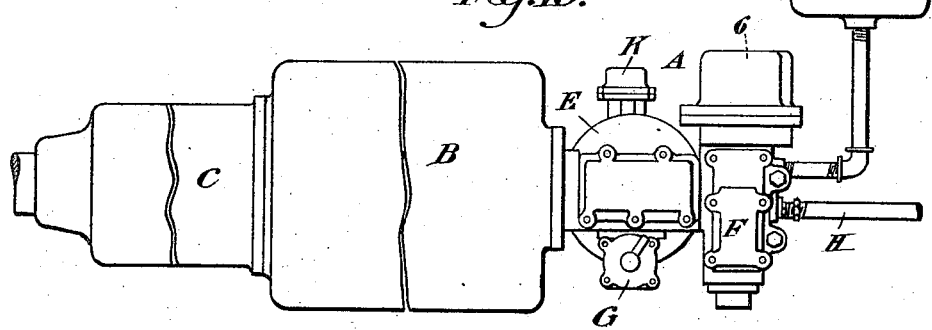

Figs. 9, 9$^a$ and 9$^b$ views similar to Fig. 8 etc., showing the valves in emergency reservoir charging position;

Figs. 10, 10$^a$ and 10$^b$ views similar to Fig. 8, etc., showing the valves in service application position;

Figs. 11, 11$^a$ and 11$^b$ views simliar to Fig. 8, etc., showing the valves in service lap position;

Figs. 12, 12$^a$ and 12$^b$ views similar to Fig. 8, etc., showing the valves in emergency position;

Fig. 13 a bottom view of the graduating valve;

Fig. 14 a top view of the main slide valve;

Fig. 15 a bottom view of the main slide valve;

Fig. 16 a plan view of the main slide valve seat;

Fig. 17 a detail vertical sectional view of the release governing valve;

Fig. 18 a bottom view of the release governing slide valve;

Fig. 19 a detail plan view of the triple valve assembled with the brake cylinder emergency reservoir and the brake pipe reservoir;

Fig. 20 a detail view of the face of the triple valve to which the pilot valve seat is secured;

Fig. 21 a detail view of the seat of the pilot valve;

Fig. 22 a detail vertical sectional view of the pilot valve in release position;

Fig. 23 a view similar to Fig. 22 showing the pilot valve in lap position;

Fig. 23ª a detail view of the pilot valve slide valve;

Fig. 24 a detail sectional view of the quick release valve;

Fig. 25 a detail sectional view on the line X—X of Fig. 5;

Fig. 26 a detail sectional view taken on the line Y—Y of Fig. 4; and

Fig. 27 a diagrammatic view of the triple valve, with the parts in brake pipe reservoir charging position and the release governing valve in quick release position.

Referring to the various parts by reference characters, A designates the triple valve body; B the emergency reservoir; C the brake cylinder and D a brake pipe reservoir (see Fig. 19).

The triple valve comprises a lower controller section E which contains the means for controlling the brake cylinder pressure; the main slide valve section F which contains the service and emergency slide valves, and the emergency pilot valve section G.

H designates the brake pipe; I the main or service slide valve; J the emergency slide valve; K the pilot valve controlling the triple valve for service applications of the brakes and for graduated release of the brakes; M the release governing valve, and N the graduating valve.

In order to simplify the description, the various ports, passages and valves, and their functions, will be described in detail in connection with the several valve operations.

The main slide valve section F of the triple valve body is provided with a brake pipe connection 1, shown in Fig. 6, which is in direct communication with a port 1ª of the emergency valve seat. The emergency slide valve J is formed with a port 2 which is adapted to cooperate with port 1ª and place the brake pipe in communication with the main brake pipe chamber 4 of the triple valve. The port 2 opens directly into an emergency valve chamber 3 which chamber is in direct and open communication with the main brake pipe chamber 4 through openings in head 126, as shown clearly in Fig. 1, so that chamber 3 is actually a part of the brake pipe chamber 4. Chamber 4 is enlarged to form the cylindrical chamber 6 in which reciprocates the large emergency piston 5, said piston forming one wall of the chamber 6 and being subject on one side to the brake pipe pressure in chamber 4 and on its other side to the pressure in chamber 6. Axially in line with chamber 6 is formed a smaller cylindrical chamber adapted to receive the main actuating piston 10, said piston being smaller than the emergency piston and axially in line therewith but on the opposite side of chamber 4. The main actuating piston is provided with an outwardly extending stem 9 which is adapted to fit within an inwardly extending tubular extension 107 of the emergency piston. The stem 9 is formed with a vertical slot 8 and the tubular extension of the emergency piston carries a vertical pin 7 which extends through said slot so that the two pistons may have a limited independent movement for purposes which will hereinafter appear. The main actuating piston is provided with a piston stem 11 which extends inwardly into a supplemental brake pipe chamber 23, said chamber 23 being on one side of the actuating piston and main brake pipe chamber being on the other side thereof, so that said piston will move in response to variations in pressure in said two chambers. A graduating spring 12 surrounds the inner end of the main piston stem, for purposes which will hereinafter appear. The main piston stem is provided with an upstanding post or stem 45 which operates through a slot in the main slide valve seat and is adapted to engage the main slide valve I. The main slide valve is formed with an operating slot 44 which permits a limited movement of the operating stem 45 without movement of the slide valve. The upper end of the stem 45 engages the graduating valve N so that said valve will always move with the actuating piston, there being no lost motion between the stem 45 and the graduating valve. The graduating valve and the main slide valve are maintained on their seats by suitable springs, and said valves reciprocate in the main slide valve chamber 27.

The controller section E of the triple valve is formed with an actuating chamber 14 which is connected directly to main brake pipe chamber 4 through passage 15 so that brake pipe pressure will always be registered in the actuating chamber. The lower wall of the actuating chamber is formed by a diaphragm 16. Below the actuating diaphragm and spaced therefrom a suitable distance, is arranged a controlling diaphragm 17. The controlling diaphragm is somewhat larger in area than the actuating diaphragm. Below the controlling diaphragm and spaced therefrom a suitable distance is arranged an emergency reservoir diaphragm 18. Each diaphragm is supported at its center by a pair of clamping disks which are threaded together, the disks of the three pairs abutting against each other so that all of the diaphragms will move together. Between the diaphragms 16 and 17 is formed a controlling chamber 52 which is in direct communication with the brake cylinder through passage 53, as will be more fully hereinafter described. This chamber is also in communication with the pilot valve K through a passage 49. Between diaphragms 17 and 18 is formed a chamber 56 which at all times, except in emergency applications of the brakes, is opened to atmosphere through passage 57. Below the emergency diaphragm 18 is formed an emergency reservoir chamber 94 which chamber is at all times in communication with the emergency reservoir through passage 95$^a$.

The casing of the pilot valve K is secured to the controller section, as shown clearly in Fig. 7, and the interior of said pilot valve casing is in direct open communication with chamber 14, so that brake pipe pressure will be registered in the pilot valve casing except during emergency applications. The pilot slide valve 19 is secured in a vertically movable stem 19$^a$ which is mounted to reciprocate in lugs formed on the pilot valve seat. The upper end of the stem 19$^a$ is operatively connected to the free end of a pilot valve lever 20 which extends into the actuating chamber. The actuating diaphragm is provided with an upwardly extending central stem which is vertically slotted for the passage of the pilot valve lever. A transverse pin 20$^a$ connects the lever to said stem, and the inner end of the lever is fulcrumed on a pin 21 supported in a suitable bracket mounted in the chamber 14 so that, as the diaphragms are vibrated, the lever 20 will be moved to actuate the pilot valve. The upper end of the stem of the diaphragm 16 is formed with a horizontally slotted head adapted to receive the headed lower end of a pin 19$^b$ said pin being secured in the upper wall of the chamber 14. This pin serves as a stop to limit the vibrations of the diaphragm 16. The stem of the actuating diaphragm is formed in two parts which are pivotally connected together by the transverse pin 20$^a$.

The stem 19$^a$ of the pilot valve is provided with a headed pin 19$^b$ to which is connected a rod 19$^c$. The lower end of this rod is provided with a head and this head is formed with an open slot which is adapted to receive the pin 19$^b$, the upper end of said rod sliding loosely through the upper bearing of the stem 19$^a$. The rod 19$^c$ above the said bearing is provided with a stop collar to limit the downward movement of the rod. Between the head on the lower end of the rod 19$^c$ and the upper bearing of the stem 19$^a$ is arranged a spring 19$^d$. When the pilot valve is moved to application position the spring 19$^d$ is compressed and serves to move the pilot valve back to lap position upon an equalization of pressures, as herein described. The rod 19$^c$ is so arranged and proportioned that the pilot valve may be moved downwardly to release position without interference.

The pilot valve slide valve 19 is formed with a groove 48 in its face which groove is adapted to cooperate with passage 49 leading to the controlling chamber 52; passage 50 leading to the exhaust 51 which is adapted to be connected to any desired form of retainer, and with passage and port 22 which leads to a port 24 in the main slide valve seat. When the pilot valve is in application position brake pipe air flows from chamber 23 through port 24, passage 22, groove 48 of the pilot valve to passage 49 and chamber 52, and thence to the brake cylinder through passage 53. When the pilot valve is in release position brake cylinder air flows through chamber 52, passage 49, groove 48 of the pilot valve to passage 50 and thence out through the retainer connection 51. The service position of the pilot valve is shown in Fig 7, and the release position thereof is shown in Fig. 22.

The main slide valve section of the triple valve body is formed with a small chamber 28 in direct open communication with the brake pipe connection 1, see Fig. 6. Connected to this chamber 28 is a port 29 which extends partly around the chamber 23 and connects with brake pipe port 30 in the main slide valve seat so that brake pipe pressure is always registered at port 30. The main slide valve seat is also formed with a brake cylinder port 55 which is connected by passage 54 to the brake cylinder. The main slide valve seat is also formed with a port 97 which is connected by passage 99 with a passage leading to the brake pipe reservoir connection 39. In this passage is arranged a check valve 98 which seats toward the connection 39 so that air cannot pass from port 97 through the brake pipe reservoir but may pass from said reservoir back to the port 97 when a superior pressure is in the brake pipe reservoir. The arrangement of check valve 98 is shown in Figs. 4, 6 and 26. The brake pipe reservoir connection 39 is connected through passage 40 with the chamber 6 so that brake pipe reservoir pressure will always be registered in chamber 6 and against one side of the emergency piston.

The emergency reservoir is connected to the triple valve through passage 65 which extends into a chamber 66 directly below the release governing valve. The release governing valve chamber 72 is provided with a valve 67 which is held upwardly to its seat by a spring 70, said valve closing communication between the release governing valve chamber and the quick-release chamber 66 so that emergency reservoir pressure will always be registered under the valve 67. A downwardly seating check valve 81 formed with a small leak port 82, is arranged in chamber 66 between the valve 67 and the passage 65, said valve seating toward the passage 65. This valve is held to its seat by a suitable spring and prevents air freely passing from chamber 66 through passage 65 to the emergency reservoir, but whenever there is a superior pressure in chamber 66 it will leak through the port 82 to the emergency reservoir (Figs. 17 and 24).

The release governing valve 61 is connected by a stem 61$^a$ to a manually reciprocable bar 61$^b$ mounted in the valve casing. The valve 61 is formed with a cross release groove 62 in its face which is adapted to connect release passage 47$^a$ to exhaust port 63, the latter port leading directly to the retainer port 51. Exhaust passage 47$^a$ extends to the exhaust port 47 in the main slide valve seat, as shown clearly in Fig. 5. When the release governing valve is in the position shown in Fig. 17, the release groove 62 connects passage 47 and port 63 for a quick release of the brakes. When the release governing valve is moved to graduated release position, 47$^a$ and 63 are closed and the release of brake cylinder pressure must take place through passage 49, groove 48 of the pilot valve, and exhaust port and passage 50 which extends from the pilot valve seat to the retainer connections 51, as shown in Fig. 7. When the release governing valve is in quick-release position the release of the brakes will take place through the main slide valve port 47 and passage 47$^a$ and also through the pilot valve groove 48 and port and passage 50.

Mounted in the release governing valve chamber is a quick-release lever 69, pivoted on pin 69$^a$. The release governing slide valve 61 is formed with upwardly extending cams 68 which are adapted to engage one end of the release lever to force the same upwardly when the slide valve is moved to quick-release position, as shown in Figs. 7 and 17. The other end of the quick-release lever is adapted to engage an upwardly extending stem formed on the quick-release valve 67 to depress and open said valve against the tension of its spring 70. When the valve 67 is open emergency reservoir air may flow directly into the quick-release valve chamber and from said chamber it will flow to main slide valve chamber 27 through passage 73. When the valve 67 is depressed air from the emergency reservoir flowing through passage 65 will lift valve 81 and pass through quick-release chamber 66 into the release governing valve chamber. From chamber 27 the high pressure air from emergency reservoir will pass to chamber 23 and also to the brake pipe through ports and passages as will be hereinafter described.

The automatic emergency valve is formed with a piston chamber 75$^a$ in which reciprocates a piston 76. Leading into the top of this chamber above the piston is a port 75 which is connected by a suitable passage to a small chamber 74 directly in communication with a brake-pipe connection 1, so that brake pipe pressure will be always registered on top of the emergency piston. This passage is shown clearly in Figs. 4, 6 and 7. In the automatic emergency pilot valve is arranged a downwardly seating valve 120 which is adapted to be engaged by headed stem 128 loosely connected at its upper end to the emergency piston 76. Surrounding this stem and operating between a rigid spider guide and the head at the lower end of said stem, is a spring 125, said spring normally holding the automatic emergency valve 120 closed. Below the automatic emergency valve is a small chamber 93$^a$ which is connected by passage 93 to the passage 92 and the emergency reservoir passage 65 so that emergency reservoir pressure will be always registered below the automatic emergency valve 120. Between the valve 120 and the emergency piston is formed a chamber 118 which is directly connected by passage 38 with the brake pipe reservoir connection 39 so that brake pipe reservoir pressure will be always registered in chamber 118. The emergency reservoir is charged through port 91 of the main slide valve and passage 92 which passage is connected through passage 93 to the emergency reservoir passage 65, shown clearly in Fig. 5. Interposed between passages 91 and 92 is a downwardly seating check valve 90 which prevents air passing back from the emergency reservoir to the main slide valve seat, which will be more fully hereinafter described.

The emergency slide valve J is connected to the emergency stem which is guided in the emergency valve chamber by a rigid spider collar 126. The emergency valve stem is provided at its outer end with an upwardly extending operating arm 108, which arm is formed at its upper end with a yoke extending around the tubular extension 107 of the emergency piston. This yoke is adapted to be engaged by the shoulder 106 on the extension 107 when the emergency piston moves inwardly to operative position. The emergency piston through said engagement with the operating arm 108 will move the emergency slide valve to emergency position.

The emergency slide valve is held to its seat by a suitable spring, as shown clearly in Fig. 1, and is moved back to lap position after an emergency application by means of the replacement spring 123.

*Full release and brake pipe reservoir charging position with release-governing valve in graduated release position. (Figs. 1, 6, 8, 8ª and 8ᵇ.)*

In charging, brake pipe pressure is raised in the usual manner. Air flows from the brake pipe H through the brake pipe connection 1, ports 1ª and 2 into the emergency valve chamber 3 and thence into the main brake pipe chamber 4. The air pressure in chamber 4 moves the emergency piston 5 and the actuating piston 10 to the position shown in Fig. 1, there being no pressure in chamber 6 at this time. The pin 7 engages the right hand end of the slot 8 so that the emergency piston carries with it the actuating piston 10 and its connected stem and the slide valves. The washer 41 will engage the inner end of the graduating spring 12 and compress it as the stem is moved outwardly. When there is an equalization of pressures in chambers 4 and 6, as will be hereinafter described, the graduating spring will move the actuating piston and the graduating valve, and also the emergency piston, inward slightly until the washer 41 engages the shoulder 42 on the valve casing. This movement of the parts will move the graduating valve only and not the main slide valve, and this position of the graduating valve is the emergency reservoir charging position (see Figs. 9, 9ª and 9ᵇ).

The air admitted to chamber 4 will flow to chamber 14 through passage 15 (see Figs. 5 and 6). As the pressure builds up in chamber 14, the diaphragms 16, 17 and 18 will be lowered and the pilot valve moved downwardly to the release position, shown in Fig. 22, the brake cylinder port 49 being connected through groove 48 to the exhaust port and passage 50. In this position of the pilot valve port 22 is open thereby connecting chamber 14, which is in open communication with the pilot valve chamber, to port 24 of the main slide valve seat (Fig. 8). Groove 26 of the main slide valve connects port 24 to port 25, this latter port leading directly into chamber 23. There is, therefore, at this time direct communication between chambers 4, 14 and 23, and as the brake pipe is in open communication with chamber 4 there will be an equalization of pressures in these chambers and on opposite sides of piston 10. At the same time brake pipe air will flow directly into chamber 27 through chamber 28, passage 29, port 30, groove 31 in the main slide valve, groove 32 in the valve seat, port 33 in the main slide valve, and port 34 in the graduating valve. (See Figs. 1, 6 and 8ª). From chamber 27 air will flow through the restricted charging port 35 of the graduating valve, through port 36 of the main slide valve into brake pipe reservoir charging port and passage 37 in the main slide valve seat. Passage 37 leads to the brake pipe reservoir through passage 37ª, passage 38 and reservoir connection 39 (Figs. 4 and 8). The emergency or quick-action chamber 6 receives air direct from passage 38 through passage 40 so that the increasing brake pipe reservoir air will flow into chamber 6, eventually equalizing with brake pipe pressure in chamber 4 on the opposite side of the emergency piston 5. When these pressures have equalized graduating spring 12, which is under tension at all times when the pressure in chamber 4 is superior to pressure in chamber 6, will move the pistons 5 and 10 inwardly, or toward the left hand, until washer 41 engages the shoulder 42, as previously described. This movement of the piston stem 11 is not sufficient to cause a movement of the main slide valve, the slot 44 in the main slide valve permitting the stem 45 to have a limited movement independently of the main slide valve. This movement of the pistons, however, will cause a movement of the graduating valve from the position shown in Fig. 8 to that shown in Fig. 9, which latter is the emergency reservoir charging position. As shown in Figs. 8 and 9, the brake cylinder release groove 46 of the main slide valve connects brake cylinder port 55 to the exhaust port 47, this latter port leading through passage 47ª to the release governing valve seat and thence to the retainer valve connection, as will be fully hereinafter described. The connection between passage 47ª and the retainer valve is closed when the release governing valve is in graduated release position, so that there can be no exhaust in brake cylinder pressure through passage 47ª when the valve is adjusted for graduating release operations and the brake cylinder exhaust under these conditions must take place through the controlling chamber 52 and the pilot valve ports and exhaust passage 50, as hereinbefore described. As hereinbefore pointed out, passage 49 leads from the pilot valve seat directly into controlling chamber 52 and this chamber is connected to the brake cylinder through passages 53 and 54. Brake cylinder port 55 is in direct connection with the brake cylinder through passage 54 (see Figs. 5 and 7).

During this charging operation atmospheric chamber 56 between diaphragms 17 and 18 is opened to atmosphere through passage 57 which leads to the main slide valve seat, grooves 58ª and 58 and cross passage 59 of the main slide valve and exhaust port and passage 60 which is in communication with the groove 58.

As hereinbefore pointed out, when operating the triple valve in graduated release, the release governing slide valve 61 is moved to the right of the position shown in Fig. 17, thereby moving the groove 62 out of register with the passages 47ᵃ and port 63. In this position of the slide valve there can be no exhaust of brake cylinder pressure through passage 47ᵃ, the release of the brake cylinder pressure taking place wholly through the controlling chamber 52 and the pilot valve connection.

Emergency reservoir passage 65 leads from the emergency reservoir to the quick-release chamber 66 below the quick-release valve 67. When the release governing valve 61 is moved to graduated release position valve 67 will be held closed by its spring 70 and air cannot pass from release governing valve chamber 72 to the emergency reservoir. Check valve 81 also serves as a means to prevent air passing to the emergency reservoir from chamber 72 (see Fig. 24), except, of course, that valve 82 is provided with a small leak port, as hereinbefore described. Brake pipe air is admitted into chamber 72 from chamber 27 through a passage 73 (see Figs. 1, 5 and 17) which is open to chamber 72 at all times. A passage 79 leads from passage 15, (see Figs. 5 and 6) and permits brake pipe air to flow from chamber 4 to release governing valve chamber 72 when the slide valve 61 is in graduated release position. The release governing slide valve is provided with a small port 80 which registers with the port 79 and permits the brake pipe air to flow into chamber 72. The object of admitting brake pipe pressure to chamber 72 will be fully set forth in connection with the description of the service position of the valve.

Brake pipe air passes from chamber 74, which is in open communication with the brake pipe connection 1, (see Fig. 6), through passage 75 to chamber 75ᵃ above the automatic emergency piston 76 (see Figs. 4, 6 and 7), and forces the piston downwardly against a leather gasket 78. This prevents air passing around the piston into chamber 118, so that brake pipe reservoir cannot be charged through said chamber and passage 38.

*Brake pipe reservoir charging position with release governing valve in quick-release position.*

For quick-release operations the release governing valve is moved to the position shown in Fig. 17, thereby placing the release groove 62 in communication with brake cylinder release passage 47ᵃ and the exhaust port 63. In this position of the valve 61 the lateral groove 80 is out of register with the passage 79, and communication between the brake pipe chamber 4 and the release governing valve chamber 72 is closed. Air will flow into the chamber 72 from the slide valve chamber 27 through the passage 73. As hereinbefore stated, quick-release valve 67 is opened by the lever 69 when the valve 61 is in quick-release position. The non-return check valve 81 located in chamber 66 where it joins passage 65 is provided with the restricted port 82 so that brake pipe air from chamber 72 may flow past valve 67 through said restriction port to the emergency reservoir for the purpose of charging the emergency reservoir when operating in quick-release. The purpose of thus charging the emergency reservoir will be fully hereinafter described. In all other respects the operation of charging the brake pipe reservoir with the governing valve in quick-release position is precisely the same as that described with the release governing valve in graduated release position.

*Emergency reservoir charging position with the release governing valve in graduated release position. (Figs. 9, 9ᵃ and 9ᵇ).*

When the pressures have equalized on opposite sides of the emergency piston 5, as hereinbefore pointed out, and the graduating spring 12 has operated to cause the graduating valve to assume the position shown in Figs. 9, 9ᵃ and 9ᵇ, brake pipe port 30 is in communication with cavity 31, in the main slide valve, which cavity is in communication with a longitudinally extending port 88 through port 89. The right hand end of passage 88 is in communication with a large cavity 96 in the face of the main slide valve and close to the cavity 31. Cavity 96 is in communication with a port 97 in the slide valve seat, said port being in communication with the brake pipe reservoir through passage 99 leading to the brake pipe reservoir connection 39, a check valve 98 being interposed in said passage and seating toward the brake pipe reservoir, so that air cannot flow through port 97 to the reservoir but may flow back to said port from the reservoir. The left hand end of passage 88 communicates with port 100ᵃ in the graduating valve which is in communication with the right-angle passage 100 of the graduating valve said right angle-passage opening on the face of the valve through ports 86, 83 and 85. Port 85 registers with port 36 in the main slide valve which port is in register with port 37 of the main slide valve seat this latter port communicating with passage 37ᵃ which leads to the brake pipe reservoir as previously described. Port 83 is in communication with main slide valve port 84, this latter passage being in communication with port 91 through the lateral extension of said port (see Fig. 9ᵃ). Port 91 leads through a passage into a chamber below a check valve 90 which check valve seats toward the port and passage 91. From the chamber above the check valve 90, passage 92 leads to a passage 93 which is in communication with the emergency reservoir passage 65 and also in communication with the chamber 93ª below the automatic emergency valve 120. Brake pipe air will flow from port 30 through 89, 88, 100ª, 100, 83, 84 and 91 past check valve 90 through 92, 93 and 65 to the emergency reservoir. Air will continue to flow to the emergency reservoir until the pressure therein has been built up to an equality with the brake pipe pressure. The emergency reservoir pressure will be registered in chamber 94 through passage 92 and 95ª (see Fig. 6). Equalization of pressures in the brake pipe, brake-pipe reservoir and emergency reservoir is assured by the connection of the ports 30, 88, 100, 36, 85, 83, 84 and 91.

*Emergency reservoir charging position with the release governing valve in quick-release position.*

When the release governing valve is in quick-release position, quick-release valve 67 is open and will permit brake pipe pressure from chamber 72 to flow through the restriction port 82 in the check valve 81 to slowly charge the emergency reservoir during the brake pipe reservoir charging period. The result of this is that when the graduating valve is moved from brake pipe reservoir charging position the charging rate is increased by opening emergency reservoir charging ports in the graduating valve and the main slide valve, that is to say, ports 83, 84 and 91, so that when the valve is in quick-release position the emergency reservoir will be partly charged through the restriction port 82 of the check valve 81 during the brake pipe reservoir charging period and will be finally charged through the said restriction port and also through the emergency reservoir charging ports in the main and graduating valves. When the emergency reservoir has been fully charged to an equalization with the brake pipe reservoir, the parts of the valve remain as shown in Figs. 9, 9ª and 9ᵇ and the valve is in running position.

Toward the rear end of the train, where the rate of increase in brake pipe pressure is slow, the brake pipe reservoir and the emergency reservoir will be charged at the same time, the triple valve remaining in emergency reservoir charging position. Of course, it will be understood that to bring about this result the rise of brake pipe pressure must be so gradual as not to move the triple valve slide valves to brake pipe reservoir charging position. In other words it must be sufficiently slow to permit a practical equalization of pressures in chamber 4 and chamber 6. If the rise is sufficiently rapid to produce a dominating pressure in chamber 4 the triple valve will be moved to brake pipe reservoir charging position and the emergency reservoir then cannot be charged until there is an equalization in chambers 4 and 6, that is to say, an equalization of pressures in the brake pipe reservoir and the brake pipe.

*Service position. Figs. 10, 10ª and 10ᵇ.*

To obtain a service application of the brakes a slow brake pipe reduction is made in the usual way, resulting in a corresponding reduction of pressure in main brake pipe chamber 4 and actuating chamber 14. The undisturbed emergency reservoir pressure in chamber 94 forces the diaphragms 16, 17 and 18 upwardly and moves the pilot valve upwardly to the position shown in Fig. 7, placing the passage 49 in communication with port 22 through the pilot valve groove 48. Air will flow from chamber 23 through port 25, groove 26, port 24 and port 22 of the pilot valve and thence through 48 and 49 to brake cylinder controlling chamber 52, and thence through passage 53 to brake cylinder passage 54, and thence to the brake cylinder. The pressure being thus reduced in chamber 23 will permit brake pipe pressure in chamber 4 to move the actuating piston 10 inwardly to service position, the main slide valve and the graduating valve taking the positions shown in Figs. 10, 10ª and 10ᵇ. The movement of the actuating piston will be sufficient to partly compress the graduating spring 12. Port 87 of the main slide valve will be in communication with port 86 of the graduating valve and with port 95 of the main slide valve seat, this latter port leading directly into chamber 23. In this arrangement of the ports, brake pipe air will flow from port 30 through 88, passage 100 and down through ports 87 and 95 into chamber 23 and establish a partial equalization of pressures on both sides of the actuating piston 10. Pressure will be built up in chamber 23 until said pressure and the pressure of the graduating spring equalizes with the pressure in chamber 4 thereby positively stopping the slide valve and the actuating piston in service position. There will, however, be a differential of pressure maintained between the chambers 23 and 4 sufficient to hold the graduating spring 12 under compression so long as the pilot valve remains in service position. There will be a nice balance between the amount of air flowing through pasasge 24 and the pilot valve to the brake cylinder and the flow of air through ports 87 and 95 into the chamber 23 with a tendency always to restrict the flow through port 95 whenever the pressure in chamber 23 plus the pressure of spring 12 tends to dominate the pressure in chamber 4.

Air from the brake pipe reservoir will flow past check valve 98 through passage 99 to port 97 of the main slide valve seat, thence through groove 96 to brake pipe port 30. The brake pipe reservoir thus is placed in open communication with the brake pipe and becomes a part thereof, augmenting the brake pipe volume in order to provide sufficient air volume for service applications of the brakes. Brake pipe air together with brake pipe reservoir air flows through cavity 96 into passage 88 and thence flows through port 100$^a$, cross port 102 to port 100$^b$ thence through passage 101 to the brake cylinder port 55 in the main slide valve seat. Port 55 is extended laterally a short distance toward the right hand for this purpose, as shown in Fig. 10. Port 55 is connected directly to the brake cylinder through passage 54. The brake cylinder pressure will also be registered in the equalizing chamber 52 between diaphragms 16 and 17, said chamber being connected to the brake cylinder passage 54 by passage 53.

Diaphragm 17 is of larger diameter than diaphragm 16. It is manifest, therefore, that the increasing pressure in the equalizing chamber 52 will create a downward energy against diaphragm 17 greater than the opposed energy against diaphragm 16. The areas of these diaphragms are preferably so proportioned that, for example, if the pressure were reduced in chamber 14, 10 pounds below the undisturbed emergency reservoir pressure in chamber 94, it would be necessary to increase the brake cylinder pressure, and likewise pressure in chamber 52, two and one-half times greater than the difference between the pressures in said chambers 14 and 94. When a 10-pound reduction is made in chamber 14, which is a brake pipe reduction, and 25 pounds has been built up in chamber 52, which is brake cylinder pressure, the differential energy created on diaphragms 16 and 17 plus the reduced pressure in chamber 14 will balance and slightly overcome the undisturbed emergency reservoir pressure in chamber 94. Thus, it will be seen that the ratio of the built up brake cylinder pressure in chamber 52, to the decreased brake pipe pressure in chamber 14 will be two and one-half to one. During the operation just described chamber 56 between diaphragms 17 and 18 is vented to atmosphere through the same ports and passages as described in full release and charging position, the grooves 58 and 58$^a$ of the main slide valve being elongated for this purpose.

When the desired brake cylinder pressure has been built up in chamber 52 the diaphragms will be lowered against the pressure in chamber 94 and the pilot valve 19 will be lowered from the position shown in Fig. 7 to the lap position shown in Fig. 23 thereby stopping the release of pressure from chamber 23 to the brake cylinder. As soon as this flow of air is stopped there will be a complete equalization of pressures on both sides of the actuating piston 10 through the passage 87 and port 95 of the main slide valve, and this equalization of pressure will permit the graduating spring 12 to move the graduating valve from the position shown in Fig. 10 to the position shown in Fig. 11, which is the service lap position. The spring 12 may move the piston 10 and the stem 45 without moving the main slide valve, the slot 44 providing the required lost motion between the main slide valve and said stem. The movement of the graduating valve to lap position takes the port 100$^a$ and cross passage 102 out of register with port 88 and also takes port 100$^b$ out of register with port 101 thereby stopping further increase of brake cylinder pressure. The movement of the actuating piston and its stem under the influence of the spring 12 is stopped by washer 104 engaging shoulder 105 of the valve casing.

If a leak should occur in the brake cylinder, the pressure in chamber 52 would be correspondingly reduced with the result that the combined pressures in chambers 14 and 52 would not be great enough to oppose the pressure in chamber 94 and the diaphragms and the pilot valve would be again operated to service position by the prevailing pressure in chamber 94. The parts shown in Fig. 1 again would be moved to service position and the pressures in the brake cylinder and chamber 52 again would be re-established sufficiently to overcome the pressure in chamber 94. It will be understood, of course, that regardless of the variations of the volume of the brake cylinder, caused by varying piston travel, the resulting brake cylinder pressure will be always the same for a given reduction of brake pipe pressure as the required brake cylinder pressure must be obtained from a given brake pipe reduction before the triple valve slide will be moved to lap position.

The movement of the actuating piston to service position will cause a corresponding movement of the emergency piston 5 due to the pin and slot connection between the stem 9 and the tubular extension of the emergency piston. The movement of the piston 5, however, will be an idle one due to the fact that shoulder 106 will not be brought into engagement with the emergency valve operating stem 108. It is also to be kept in mind that during this movement of the actuating piston the pressures on opposite sides of the emergency piston 5 will be equalized due to the fact that these chambers are in communication through ports and grooves 30, 96 and 97, (see Figs. 10$^a$ and 10$^b$). As hereinbefore pointed out, port 30 is in communication with the brake pipe and port 97 is in communication with the brake pipe reservoir and with chamber 6. It is manifest that there will be no movement of the emergency slide valve during the service movement of the actuating piston and emergency piston. This is true as to all movements of the actuating piston except when said piston is moved to emergency position.

In the service position of the main slide valve release groove 46 is out of register with the brake cylinder port 55 and the brake pipe reservoir supply port 36 is out of register with the charging port 37.

Graduated release.

When it is desired to adjust the triple valve for graduated release operations the release governing slide valve is moved to the right from the position shown in Fig. 17 thereby moving the release groove 62 out of register with brake cylinder release passage 47ª and the exhaust port 63 which leads to the retainer connection, so that release of brake cylinder air will not take place through the main slide valve ports. Quick-release lever 69 will be released from the cam 68 and quick-release valve 67 will be closed to prevent emergency reservoir air entering chamber 72. The small lateral passage 80, (see Fig. 18), will be in register with brake pipe port 79 and brake pipe pressure will then be registered in chamber 72 and also in chamber 27 above the main slide valve, passage 73 affording free communication between these two chambers. Assuming the triple valve to be in service lap position and the desired brake cylinder pressure built up and a partial release of the brakes is desired, the brake pipe pressure in chambers 4 and 14 will be slightly increased. The result of this is that the combined brake pipe pressure in chamber 14 and brake cylinder pressure in chamber 52 will overbalance the emergency reservoir pressure in chamber 94 and the diaphragms and the pilot valve 19 will be lowered to release position, as shown in Fig. 22. Brake cylinder pressure will then flow back through chamber 52, passage 49 groove 48 of the pilot valve and passage 50 to the retainer connection. When the brake cylinder pressure and likewise pressure in chamber 52 has been reduced sufficiently, the pressure in chamber 94 will raise the diaphragms and move the pilot valve to lap position, as shown in Fig. 23, thereby preventing further decrease in brake cylinder pressure. This operation may be continued in steps until the pressure in chamber 14 has been stepped up to an equality with the pressure in chamber 94 at which time all of the brake cylinder pressure will have been released. It is manifest, therefore, that the brake cylinder pressure may be increased or decreased in a degree exactly in proportion to the difference in pressure between chamber 14 and 94 and that this proportion is governed by the difference in area between diaphragms 16 and 17.

Non-overcharging of the emergency reservoir.

When operating long trains it is necessary to use the full release position of the engineer's brake valve in order to increase the brake pipe pressure at the desired rate in the rear end of the brake pipe. This position of the brake valve opens free communication between the main reservoir and the brake pipe thereby producing an excessive brake pipe pressure at the head end of the train, and this tends to overcharge the emergency reservoirs at the head end of the train. In the use of this triple valve, however, emergency reservoir cannot be charged until there has been an equalization between the brake pipe and the brake pipe reservoirs, and as hereinbefore pointed out, the time required to charge the brake pipe reservoirs is greater than the time during which the excessive brake pipe pressure is maintained in release operations, therefore it is impossible to overcharge the emergency reservoirs unless the excessive brake pipe pressure is maintained for an unusually long period. After the release of the brakes the engineer's brake valve is moved to running position. If at this time the brake pipe reservoir pressure, which is in chamber 6 is higher than the brake pipe pressure as regulated by the feed valve on the locomotive, the pressure in said chamber 6 will operate the triple valve to service position and the excess pressure in the brake pipe reservoir will be released back into the brake pipe through ports 97, groove 96 and port 30, (see Fig. 10ª), but there will be no application of the brakes. Immediately upon an equalization of pressures in the brake pipe and the brake pipe reservoir, and, of course, in chambers 4 and 6 the triple valve slide valves will be moved to lap position. The brake cylinder and chamber 52 will be opened to atmosphere through the pilot valve so that any air passing to the brake cylinder through port 55 will be released and there will be no operation of the brake cylinder piston and no pressure built up in the brake cylinder.

If the emergency reservoir should leak down slightly after a long braking period, when operating in graduated release, the pressure in the emergency reservoir may be restored by increasing the pressure and moving the triple valve to emergency reservoir charging position. If the triple valve slide valves should assume service position, as just described, by reason of the overcharging of the brake pipe reservoir a second charging port 110 through the main slide valve will be in communication with the emergency reservoir charging port 110ª, this latter port connecting with passage 91 which leads to the emergency reservoir (Figs. 11ᵇ and 16). Of course, this recharging of the emergency reservoir can only take place when the brake pipe pressure in chamber 27 is superior to the emergency reservoir pressure, at which time brake pipe air will pass from chamber 27 through ports 110 and 110ª into passage 91. The check valve 90 between passages 91 and 92 prevents emergency reservoir air passing back through passage 92 and to passage 91.

Uniform graduated release.

When operating in graduated release the brake cylinder pressure is not only released in exact proportion to the increase of the brake pipe in pounds pressure, but also in exact proportion to the rate of rise in brake pipe pressure in time. With the non-overcharging feature, hereinbefore described, which prevents overcharging of the emergency reservoirs it is possible to quickly increase brake pipe pressure at the rear end of long trains by using the full release position of the engineer's brake valve. By using the restricted release of the brake cylinder pressure through the pilot valve the brakes at the rear end of the trains will be partly released before it is possible to completely release the brakes at the head end of the train.

Quick release.

To adjust the triple valve for quick-release operations the release governing valve is placed in the position shown in Fig. 17, as hereinbefore described. This position of the governing valve permits a free release of brake cylinder pressure through the main slide valve port 47 and passage 47ª, release groove 62 and exhaust port 63. This position of the release governing valve also admits emergency reservoir air to chamber 72 and from said chamber to main slide valve chamber 27 through passage 73. To obtain a quick release of the brakes after a service application, the brake pipe pressure is increased in the usual manner resulting in an increase of pressure in chamber 4. The increased brake pipe pressure will also be admitted to port 30 of the main slide valve seat but it cannot flow to the brake pipe reservoir or to chamber 6 because of the check valve 98. Thus pressure will be built up in chamber 4 above that in chamber 6 and the pistons 5 and 10 will be moved to the positions shown in Fig. 1. The emergency reservoir pressure which is in chamber 27 at this time, through passage 65 chamber 66 and around valve 67, which valve has been opened by the release governing lever 69, will then flow through port 34 of the graduating valve, passage 33, grooves 31 and 32 and direct to brake pipe through port 30, passage 29 and chamber 28. (Fig. 6). The brake pipe pressure will be thus suddenly increased and equalized at a high point with the emergency reservoir, propagating a release wave of high pressure air through the brake pipe and resulting in a quick serial release of the brakes. The release groove 46 of the main slide valve establishes communication between brake cylinder port 55 and release port 47, and a free quick release of brake cylinder pressure to atmosphere will take place through ports of the release governing valve. At the same time the pilot valve will be in release position and thus afford a second means for releasing brake cylinder pressure as well as releasing the brake cylinder pressure from chamber 52.

When the valves are moving to release position due to the increasing pressure in chamber 4, port 87ª of the main slide valve is uncovered by the graduating valve, as shown in Fig. 8ᵇ, and as it moves across the port 95 in the main slide valve seat, emergency reservoir air, which is in chamber 27, will flow through ports 87ª and 95 into chamber 23. This high pressure air will immediately force the actuating piston and all of the valves to full release position, thereby assisting the increasing brake pipe pressure in chamber 4. When the valves are in full release position, as shown in Fig. 8ᵇ, port 87ª will be moved away from port 95. When the valve is operating in graduated release, brake pipe pressure in chamber 27 is also in chamber 23 so that while port 87ª will move across port 95 in graduated release operations there will be no flow of air through these ports because the pressures in the chambers 27 and 23 are equal.

Emergency application. (Figs. 12, 12ª and 12ᵇ).

To obtain an emergency application of the brakes a sudden and prolonged reduction of the brake pipe pressure is made in the usual manner. A corresponding reduction will, of course, result in chamber 4 and as this reduction is at a greater rate than it is possible for the brake pipe reservoir air to flow back to the brake pipe through groove 96 while the triple valve is passing service position, the pressure in chamber 6 will predominate over that in chamber 4. This predominating pressure in chamber 6 will move the emergency piston inwardly a sufficient distance to cause the extension 107 of said piston to engage the shoulder 112 of the actuating piston and will bring shoulder 106 against the operating arm 108 and carry the emergency valve and the main and graduating slide valves to emergency position, (see Figs. 3, 12, 12ª and 12ᵇ). In this position of the emergency slide valve, port 2 will be in communication with a port 114 and the pressure in chamber 4 will pass to the brake cylinder through ports 2 and 114, passages 115 and 54 (Fig. 7). Release groove 116 of the emergency valve will connect brake pipe port 1$^a$ to the exhaust port 117 thereby venting the brake pipe directly to atmosphere. As this local venting of the brake pipe occurs in each triple valve there will be a rapid and positive serial emergency action of all of the triple valves throughout the train.

The sudden reduction in brake pipe pressure is communicated to chamber 75$^a$ above the emergency pilot valve piston 76 through chamber 74 and passage 75, (see Figs. 4, 6 and 7). Upon this sudden reduction of pressure in chamber 75$^a$ brake pipe reservoir pressure in chamber 118 will move piston 76 upwardly and seat it against the leather gasket 119, thereby opening the automatic emergency valve 120 and permitting emergency reservoir air to flow from chamber 93$^a$ into chamber 118 and through passage 38 to the brake pipe reservoir. Both the emergency reservoir and brake pipe reservoir air will then flow past check valve 98 to passage 99 and then to the main slide valve chamber 27 through port 97 in the main slide valve seat, and from chamber 27 direct to the brake cylinder through brake cylinder supply port 55, (see Figs. 12 and 12$^a$).

The chamber 56 of the pilot valve mechanism, which, during all operations previously described, was vented to atmosphere, now receives brake cylinder pressure. The main slide valve has moved sufficiently toward the left to take grooves 58 and 58$^a$ out of register with passages 57 and 60. Port 121, shown in Figs. 14 and 15 and in dotted lines in Fig. 12, is now in communication with passage 57 and permits brake cylinder pressure to pass from chamber 27 to chamber 56. The pressure in chamber 94 also equalizes with the pressure in the brake cylinder and in the other chambers, thereby equalizing the pressures in chambers 14, 52 56 and 94 and rendering the diaphragm mechanism inoperative or balanced.

The supplemental brake pipe chamber 23 is vented through port 122, groove 31, groove 32, groove 96 and brake pipe port 30, (see Fig. 12$^b$).

When the emergency slide valve is moved to full emergency position, as shown in Fig. 3, brake pipe chamber 4 is cut off from the brake pipe and is connected to the brake cylinder through port 2, passages 114 and 115 and passage 54, so that brake cylinder pressure will build up into chamber 4. Chamber 4 will also be connected to chamber 14 through passage 15 and the increasing brake cylinder pressure will be built up in chamber 14. The controlling chamber 52 of the pilot valve mechanism will be connected to the brake cylinder through passages 53 and 54. When the brake cylinder pressure has built up in chamber 4 to an equalization with the pressure in chamber 6, the replacing spring 123 will move the slide valve J and, through operating arm 108 the emergency piston 5, toward the right hand until the pin 7 engages the outer wall of the slot 8. The high brake cylinder pressure in chamber 4 will hold the actuating piston 10 firmly against the leather gasket 124 and prevent further movement of the slide valve J by the replacing spring. The actuating piston 10 thus serves as a positive stop for the emergency slide valve in this operation of the triple valve. The movement of the emergency slide valve will be sufficient to close port 1$^a$ and cut off communication between the brake pipe and the vent port 117, as shown clearly in Fig. 2. This is what I term the emergency lap position.

To release brake cylinder pressure after an emergency application, the brake pipe pressure is raised in the usual manner. As communication is closed between the brake pipe and chamber 4 the increasing brake pipe pressure will pass from connection 1 through port 30 and the connected grooves to port 122, and thence into the supplemental brake pipe chamber 23, (see Fig. 12$^b$). The increasing brake pipe pressure will also pass to the chamber 75$^a$ above the automatic emergency piston 76, and when the pressure above said piston is sufficient, assisted by the spring 125, the automatic emergency valve 120 will be seated. When the pressure in chamber 23 has been raised approximately to an equality with the brake cylinder pressure in chambers 4 and 6, piston 10, assisted by springs 12 and 123, will move the main slide valve and graduating valve to service lap position and the washer 104 will engage the shoulder 105 and arm 108 will engage the stop 127. This movement of the emergency valve will bring port 2 into register with the brake pipe port 1$^a$ and the increasing brake pipe pressure will then be admitted into chamber 4, and as said pressure is increased the emergency piston 5 will carry the actuating piston 10 and the slide valves to full-release and brake pipe reservoir charging position, as shown in Fig. 1.

The operation of the triple valve to emergency position is precisely the same whether the release-governing valve is in quick-release position or graduated-release position, except that when it is in quick-release position the quick-release valve 67 will be open and emergency reservoir air will flow in two directions to the main slide valve chamber 27, the second direction being from quick-release chamber 66 past valve 67 and thence through passage 73. When operating in graduated release the emergency reservoir air flows to chamber 27 through the ports and passages of the automatic emergency valve and passage 38, as hereinbefore described.

Automatic emergency operation.

The automatic emergency action of the triple valve is controlled by the automatic emergency pilot valve G. The spring 125 is adjusted to resist a pressure of 50 pounds beneath the valve 120. When the brake pipe pressure and the brake pipe reservoir pressure have been reduced 50 pounds, the pressure in chamber 118 will be likewise reduced 50 pounds. The undisturbed emergency reservoir pressure in chamber 93$^a$ will then overcome the pressure of spring 125 and open valve 120, thereby admitting the emergency reservoir air to chamber 118 and through passage 38 to chamber 6. This high pressure air in chamber 6 will move the piston 5 inwardly against the reduced brake pipe pressure in chamber 4 and the triple valve will assume emergency position, as shown in Fig. 3.

In either a straight emergency operation or an automatic emergency operation, it is the dominating pressure in chamber 6 that moves the triple valve to emergency position. The straight emergency operation is obtained by sudden and prolonged reduction in brake pipe pressure in chamber 4 below the brake pipe reservoir pressure in chamber 6. The automatic emergency operation is brought about by the sudden increase of pressure in chamber 6 due to the automatic action of the emergency pilot valve in admitting emergency reservoir pressure to said chamber 6 through chamber 118 and passage 38.

What I claim is:

1. A triple valve for air brake apparatus formed with a main brake pipe chamber having aligned cylindrical extensions of different diameters, an actuating piston in the inner smaller extension, a larger emergency piston in the outer larger extension, a supplemental brake pipe chamber on the opposite side of the actuating piston from the main brake pipe chamber, a quick-action chamber on the opposite side of the emergency piston from the main brake pipe chamber, a main slide valve, a graduating valve, means operatively connecting said valves to the actuating piston, an emergency valve chamber, an emergency valve in said chamber, means affording a lost-motion connection between the emergency piston and the emergency valve, and a lost-motion connection between the emergency piston and the actuating piston, the main and graduating valves being formed with ports and passages to control the admission and release of the brake cylinder pressure and the emergency valve being formed with ports to locally vent the brake pipe for emergency applications of the brakes.

2. A triple valve for air brake apparatus comprising a main service slide valve, an actuating piston connected to the main slide valve and having a slight independent movement, a graduating valve connected positively to the actuating piston and moving therewith, said main and graduating valves having a brake pipe reservoir charging position, an emergency reservoir charging position and an application position, a main brake pipe chamber on one side of the actuating piston and a supplemental brake pipe chamber on the opposite side of said piston, an emergency piston in the main brake pipe chamber axially in line with the actuating piston and having a quick-action chamber formed on one side thereof, said chamber having a connection for a brake pipe reservoir, means connecting the actuating piston with the emergency piston whereby the increasing pressure in the main brake pipe chamber will hold the graduating valve in brake pipe reservoir charging position and close the emergency reservoir charging ports until there is an equalization of pressures in the main brake pipe chamber and in the quick-action chamber, and a graduating spring arranged to be compressed when the main and graduating valves are moved into position to close the emergency reservoir charging ports, said spring moving the graduating valve to open the said ports when the pressures in the main brake pipe chamber and in the quick-action chamber have equalized, said spring being also arranged to be compressed when the valves are moved to application position.

3. A triple valve for air brake apparatus in accordance with claim 2, the actuating piston being formed with a stem extension projecting into the main brake pipe chamber and the emergency piston being formed with a sleeve fitting over said extension and having a pin-and-slot connection therewith, the triple valve casing being formed with an emergency valve chamber in open communication with the main brake pipe chamber, an emergency valve in said chamber, an arm connected to said emergency valve and adapted to be engaged by the sleeve of the emergency piston when said piston moves to emergency position, and a spring operating on said emergency valve and serving to move said valve to lap position and to full-release position in response to the movements of the emergency and actuating pistons.

4. A triple valve for air brake apparatus in accordance with claim 3, the emergency valve in emergency position venting the brake pipe to atmosphere and connecting the main brake pipe chamber to the brake cylinder.

5. A triple valve for air brake apparatus comprising a main service slide valve, an actuating piston connected to said slide valve and having a slight independent movement, a graduating valve connected positively to the actuating piston and moving therewith, the main and graduating valves having a brake pipe reservoir charging position and ports and passages connecting a brake pipe port with the main slide valve chamber and said chamber to the brake pipe reservoir port and also an emergency reservoir charging position and ports and passages to connect the brake pipe to the emergency reservoir charging port through the graduating valve, a main brake pipe chamber formed on one side of the actuating piston and a supplemental brake pipe chamber formed on the opposite side of said piston, an emergency piston in the main brake pipe chamber and having a quick-action chamber formed at one side thereof and connected to a brake pipe reservoir, means connecting the actuating piston with the emergency piston whereby the pressure in the main brake pipe chamber will hold the graduating valve in position to close the emergency reservoir charging ports until there is an equalization of pressures in the main brake pipe chamber and in the quick-action chamber, and a spring connected to the actuating piston and arranged to be compressed when the valves are moved to full-release position and serving to move the graduating valve to open the emergency reservoir charging port when there is an equalization of pressures in the main brake pipe chamber and in the quick-action chamber, said spring being also arranged to be compressed when the valves are moved to application position and serving to move the graduating valve to lap position on an equalization of pressures in the main brake pipe chamber and in the supplemental brake pipe chamber.

6. A triple valve in accordance with claim 5, the main slide valve seat having a brake pipe and a brake pipe reservoir port and the main and graduating valves having a service position and provided with ports and passages connecting the brake pipe and brake pipe reservoir ports to the brake cylinder in the service position of said valves.

7. A triple valve in accordance with claim 6, the main and graduating valves having an emergency position and provided with ports and passages to connect the supplemental brake pipe chamber with the brake pipe and in emergency position opening the brake pipe reservoir port and the brake cylinder port to the main slide valve chamber.

8. A triple valve in accordance with claim 7, and provided with an emergency pilot valve controlling communication between a separate source of emergency pressure and the brake pipe reservoir port of the main slide valve seat, said emergency pilot valve operating upon an emergency reduction in brake pipe pressure to admit air to the main slide valve chamber through said brake pipe reservoir port.

9. A triple valve in accordance with claim 8, the emergency pilot valve being held closed by brake pipe pressure and the pressure of a spring operating against the emergency braking pressure.

10. A triple valve in accordance with claim 5 combined with a pilot valve controlling communication between the brake pipe and the supplemental brake pipe chamber.

11. A triple valve in accordance with claim 5, combined with a pilot valve controlling communication between the main brake pipe chamber and the supplemental brake pipe chamber.

12. A triple valve in accordance with claim 5, combined with a pilot valve controlled by brake pipe, brake cylinder and emergency reservoir pressures and controlling communication between the supplemental brake pipe chamber and the brake cylinder and between the main brake pipe chamber and the supplemental brake pipe chamber and between the brake cylinder and atmosphere.

13. An air brake apparatus comprising a brake pipe, a brake pipe reservoir, an emergency reservoir, a brake cylinder, and a triple valve comprising a main service slide valve, an actuating piston connected to said slide valve and having a slight independent movement, a graduating valve connected positively to the actuating piston and moving therewith, the main and graduating valves having a brake pipe reservoir charging position and ports and passages connecting a brake pipe port with the main slide valve chamber and said chamber to the brake pipe reservoir port and also an emergency reservoir charging position and ports and passages to connect the brake pipe to the emergency reservoir charging port through the graduating valve, a main brake pipe chamber formed on one side of the actuating piston and a supplemental brake pipe chamber formed on the opposite side of said piston, an emergency piston in the main brake pipe chamber and having a quick-action chamber formed at one side thereof and connected to a brake pipe reservoir, means connecting the actuating piston with the emergency piston whereby the pressure in the main brake pipe chamber will hold the graduating valve in position to close the emergency reservoir charging port until there is an equalization of pressures in the main brake pipe chamber and in the quick-action chamber, and a spring connected to the actuating piston and arranged to be compressed when the valves are moved to full-release position and serving to move the graduating valve to open the emergency reservoir charging port when there is an equalization of pressures in the main brake pipe chamber and in the quick-action chamber, said spring being also arranged to be compressed when the valves are moved to application position and serving to move the graduating valve to lap position on an equalization of pressures in the main brake pipe chamber and in the supplemental brake pipe chamber.

14. An air brake apparatus comprising a brake pipe, a brake pipe reservoir, an emergency reservoir, a brake cylinder, and a triple valve comprising a main service slide valve, an actuating piston connected to said slide valve and having a slight independent movement, a graduating valve connected positively to the actuating piston and moving therewith, the main and graduating valves having a brake pipe reservoir charging position and ports and passages connecting a brake pipe port with the main slide valve chamber and said chamber to the brake pipe reservoir port and also an emergency reservoir charging position and ports and passages to connect the brake pipe to the emergency reservoir charging port through the graduating valve, a main brake pipe chamber formed on one side of the actuating piston and a supplemental brake pipe chamber formed on the opposite side of said piston, an emergency piston in the main brake pipe chamber and having a quick-action chamber formed at one side thereof and connected to a brake pipe reservoir, means connecting the actuating piston with the emergency piston whereby the pressure in the main brake pipe chamber will hold the graduating valve in position to close the emergency reservoir charging port until there is an equalization of pressures in the main brake pipe chamber and in the quick-action chamber, and a spring connected to the actuating piston and arranged to be compressed when the valves are moved to full-release position and serving to move the graduating valve to open the emergency reservoir charging port when there is an equalization of pressures in the main brake pipe chamber and in the quick-action chamber, said spring being also arranged to be compressed when the valves are moved to application position and serving to move the graduating valve to lap position on an equalization of pressures in the main brake pipe chamber and in the supplemental brake pipe chamber, the main slide valve seat having a brake pipe and a brake pipe reservoir port and the main and graduating valves having a service position and provided with ports and passages connecting the said brake pipe and brake pipe reservoir ports to the brake cylinder in the service position of said valves, the main and graduating valves also having an emergency position and provided with ports and passages to connect the supplemental brake pipe chamber with the brake pipe and in emergency position opening the brake pipe reservoir port and the brake cylinder port to the main slide valve chamber, and provided with an emergency pilot valve controlling communication between the emergency reservoir and the brake pipe reservoir port of the main slide valve seat, said emergency pilot valve operating upon an emergency reduction in brake pipe pressure to admit air to the main slide valve chamber through said brake pipe reservoir port, and a spring holding the emergency pilot valve closed against the emergency reservoir pressure.

15. A triple valve for air brake apparatus formed with a main brake pipe chamber having on opposite sides aligned concentric extensions of different diameters, an actuating piston in the inner smaller extension, a larger emergency piston in the outer larger extension, a supplemental brake pipe chamber on the opposite side of the actuating piston from the main brake pipe chamber, a quick-action chamber on the opposite side of the emergency piston from the main brake pipe chamber, a main slide valve, a graduating valve, a piston stem connected to the actuating piston and to said valves, an emergency valve chamber formed in the triple valve below the main slide valves, an emergency valve in said chamber, an operating arm connected to said emergency valve and adapted to be engaged by the emergency piston, an outwardly extending stem extension connected to the actuating piston and extending into the main brake pipe chamber, a sleeve formed on the emergency piston and adapted to embrace said stem extension, a pin-and-slot connection between said extension and said sleeve, the main and graduated valves being formed with ports and passages to control the admission and release of brake cylinder pressure and with ports and passages which in the service application position of said valves admit brake pipe air to the supplemental brake pipe chamber, the emergency valve being formed with ports to locally vent the brake pipe for emergency applications of the brakes and to connect the main brake pipe chamber to the brake cylinder, and a spring connected to the stem of the actuating piston and adapted to be compressed when the valves are moved to full-release position and to be oppositely compressed when the valves are moved to application position.

16. A triple valve in accordance with claim 15, combined with a pilot valve controlling communication between the brake pipe and the supplemental brake pipe chamber.

17. A triple valve in accordance with claim 16, the pilot valve being controlled by brake cylinder, brake pipe and emergency reservoir pressures.

18. A triple valve in accordance with claim 16, combined with a pilot valve controlled by brake cylinder brake pipe and emergency reservoir pressures and operating upon a reduction of brake pipe pressure to connect the supplemental brake pipe chamber to the brake cylinder and operated by brake cylinder pressure to disconnect the supplemental brake pipe chamber from the brake cylinder and thereby bring about an equalization of pressures in the main brake pipe chamber and supplemental brake pipe chamber.

19. A triple valve for air brake apparatus comprising two movable abutments of different areas, valves connected to and operated by said abutments, means whereby the smaller abutment controls the valves in service applications upon a gradual reduction in brake pipe pressure to admit air from one source of fluid pressure to a brake cylinder and the larger abutment controls the valves in emergency applications upon a sudden reduction in brake pipe pressure to admit air from a separate source of pressure to the brake cylinder, the latter abutment being operable by rising brake pipe pressure upon an increase in brake pipe pressure after a service application to move the smaller abutment to release position, a manually operable release-governing slide valve formed with a groove to control the quick release of brake cylinder pressure when said slide valve is in quick-release position, a spring-pressed quick-release valve arranged to be closed when the release-governing valve is in graduated-release position, and a quick-release lever engaging said quick-release valve and adapted to be moved by the release-governing slide valve to open the quick-release valve when the said valve is in quick-release position, whereby air from said separate source of emergency braking pressure may be admitted to the brake pipe for a quick release of the brakes upon an increase of brake pipe pressure after a service application of the brakes.

20. A triple valve for air brake apparatus comprising two movable abutments of different areas, valves connected to and operated by said abutments, means whereby the smaller abutment controls the valves in service applications upon a gradual reduction in brake pipe pressure to admit air from one source of fluid pressure to a brake cylinder and the larger abutment controls the valves in emergency applications upon a sudden reduction in brake pipe pressure to admit air from a separate source of pressure to the brake cylinder, the latter abutment being operable by rising brake pipe pressure upon an increase in brake pipe pressure after a service application to move the smaller abutment to release position, a release-governing valve having a quick-release position and a graduated-release position and comprising a slide valve formed with a release groove adapted to connect the brake cylinder release port to atmosphere, a spring-pressed quick-release valve controlling communication between the source of emergency braking pressure and the release-governing valve chamber, means whereby the release-governing slide valve in quick-release position will open the said spring-pressed valve to permit emergency braking pressure to flow into the release-governing valve chamber, and means to permit air to flow from said release-governing valve chamber to the brake pipe when the abutment-operated valves are moved to release position by an increase of brake pipe pressure after a service application of the brakes.

21. A triple valve in accordance with claim 20, the release-governing valve chamber being connected to the abutment-operated valve chamber and these latter valves being provided with ports connecting the said valve chamber to the brake pipe when said valves are in release position, whereby in quick-release operations the emergency braking pressure may flow from the release-governing valve chamber to the brake pipe upon an increase of brake pipe pressure after a service application of the brakes.

22. A triple valve in accordance with claim 21, one of the abutment-operated valves being provided with a port which as the said valves move to release position temporarily permits emergency braking pressure to flow to one side of the smaller abutment to quickly move the abutment-operated valves to full-release position upon an increase of brake pipe pressure after a service application of the brakes.

23. A triple valve for air brake apparatus formed with a main brake pipe chamber having extensions of different diameters, an actuating piston in the inner smaller extension, a larger emergency piston in the outer larger extension, a supplemental brake pipe chamber on the opposite side of the actuating piston from the main brake pipe chamber, a quick-action chamber on the opposite side of the emergency piston from the main brake pipe chamber, a main slide valve, a graduating valve, means operatively connecting said valves to the actuating piston, an emergency valve chamber, an emergency valve in said chamber, means affording a lost-motion connection between the emergency piston and the emergency valve, a lost-motion connection between the emergency piston and the actuating piston, the main and graduating valves moving to application position upon a reduction of brake pipe pressure and being formed with ports and passages to control the admission and release of brake cylinder pressure and the emergency valve being formed with ports to locally vent the brake pipe for emergency applications of the brakes upon a sudden reduction of brake pipe pressure and adapted in emergency position to cut off communication between the main brake pipe chamber and the brake pipe, a release-governing valve having a quick-release position and a graduated-release position and comprising a slide valve formed with a release groove adapted to connect the brake cylinder release port of the main slide valve to atmosphere, a spring-pressed quick-release valve controlling communication between the source of emergency braking pressure and the release-governing valve chamber, means whereby the release-governing slide valve in quick-release position will open the spring-pressed quick-release valve to permit emergency braking pressure to flow into the release-governing valve chamber, and means connecting the release-governing valve chamber to the main slide valve chamber, the main and graduating valves being provided with ports to permit air to flow from the main slide valve chamber to the brake pipe when the said valves are in full-release position.

24. A triple valve in accordance with claim 23, the main slide valve and its seat being provided with ports which register and pass each other as the main slide valve is moved to release position and temporarily permit emergency braking pressure to flow from the main slide valve chamber into the supplemental brake pipe chamber to quickly move the slide valves to full-release position upon an increase of brake pipe pressure after a service application of the brakes.

25. A triple valve for air brake apparatus formed with a main brake pipe chamber, an actuating piston subject to the pressure in said chamber, a supplemental brake pipe chamber on the opposite side of the actuating piston from the main brake pipe chamber, a main slide valve, a graduating valve, means operatively connecting said valves to the actuating piston, the main and graduating valves being formed with ports and passages to control the admission and release of brake cylinder pressure, a release-governing valve having a quick-release position and a graduated-release position, and means whereby the said release-governing valve in its quick-release position will permit high-pressure air to flow to the main slide valve chamber, said release-governing valve in its quick-release position connecting the brake cylinder port of the main slide valve to atmosphere, the main slide valve and its seat being provided with ports which register and pass each other as the main slide valve is moved to release position and temporarily permit emergency braking pressure to flow from the main slide valve chamber into the supplemental brake pipe chamber to quickly move the slide valves to release position upon an increase of brake pipe pressure after a service application of the brakes, and the main and graduating valves being provided with ports to permit air to flow from the main slide valve chamber to the brake pipe when said valves are in full-release position.

26. A triple valve for air brake apparatus formed with a main brake pipe chamber, an actuating piston subject to the pressure in said chamber, a supplemental brake pipe chamber on the opposite side of the actuating piston from the main brake pipe chamber, a main slide valve, a graduating valve, means operatively connecting said valves to the actuating piston, the main and graduating valves being formed with ports and passages to control the admission and release of brake cylinder pressure, a release-governing valve having a quick-release position and a graduated-release position, means operating when the release-governing valve is in quick-release position to temporarily permit emergency braking pressure to flow into the supplemental brake pipe chamber while the slide valves are moving to release position to quickly complete the release movement of said slide valves, and means to permit emergency braking pressure to flow to the brake pipe when the valves are in full-release position.

27. A triple valve for air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit air to a brake cylinder, means operating when the slide valve is in application position to admit air to the exhausted side of the actuating piston to stop said piston and slide valve in application position, means controlled by brake cylinder pressure to cause the slide valve to move to lap position, means operating on an increase of brake pipe pressure after a service application of the brakes to start the movement of the slide valve to release position, a release-governing valve having a quick-release position and a graduated-release position, means operating when the release-governing valve is in quick-release position and the slide valve has made a partial movement toward release position to admit high-pressure air to one side of the actuating piston to thereby quickly complete the movement of the slide valve to full-release position, and means to admit high-pressure air to the brake pipe through the triple valve when the slide valve is in full-release position.

28. A triple valve for air brake apparatus operating upon a slow reduction in brake pipe pressure to admit air to the brake cylinder for a service application of the brakes and operating upon an increase of brake pipe pressure after a service application of the brakes to move to release position, a release-governing valve having a quick-release position and a graduated-release position, means operating when the release-governing valve is in quick-release position and after the triple valve has made a partial movement toward release position to admit high-pressure air to quickly complete the movement of the triple valve to full-release position, and means admitting high-pressure air to the brake pipe when the valve is in full-release position.

29. A triple valve for air brake apparatus comprising a slide valve and an actuating piston, means operating upon a slow reduction in brake pipe pressure to move said piston and slide valve for a service application of the brakes, means whereby said actuating piston and slide valve will be moved to release position upon an increase in brake pipe pressure, and means to admit high-pressure air to one side of said actuating piston after said piston and slide valve have made a partial movement toward release position, said high-pressure air quickly completing the movement of the piston and slide valve to full-release position.

30. An air brake apparatus comprising a triple valve, a brake pipe, a brake pipe reservoir, an emergency reservoir, a release-governing valve having a quick-release position and a graduated-release position, means in the triple valve operating upon a slow reduction in brake pipe pressure to connect the brake pipe and brake pipe reservoir to the brake cylinder for a service application of the brakes, said means operating upon an increase in brake pipe pressure after a service application of the brakes to move the triple valve to release position, means operating when the release-governing valve is in quick-release position and after the triple valve has made a partial movement toward release position to admit emergency reservoir air into the triple valve to quickly complete the movement of said valve to full-release position, and means permitting emergency reservoir air to flow to the brake pipe through the triple valve when said valve is in full-release position.

31. An air brake apparatus comprising a brake pipe, a brake pipe reservoir, an emergency reservoir, a triple valve formed with a main brake pipe chamber, an actuating piston subject to the pressure in said chamber, a supplemental brake pipe chamber on the opposite side of the actuating piston from the main brake pipe chamber, a main slide valve, a graduating valve, means operatively connecting said valves to the actuating piston, the main and graduating valves being formed with ports and passages to control the admission and release of brake cylinder pressure, a release-governing valve having a quick-release position and a graduated-release position, means operating upon an increase in brake pipe pressure after a service application of the brakes to move the actuating piston and the main slide valve to release position, means operating when the release-governing valve is in quick-release position and after the main and graduating valves have made a partial movement toward release position to admit emergency reservoir air into the supplemental brake pipe chamber to quickly complete the movement of the slide valves and the actuating piston to full-release position, and means admitting emergency reservoir air to the brake cylinder after the main and graduating valves have reached full-release position.

32. An air brake apparatus comprising a brake pipe, a brake pipe reservoir, an emergency reservoir, a triple valve formed with a main brake pipe chamber having extensions of different diameters, an actuating piston in the inner smaller extension, a larger emergency piston in the outer larger extension, a supplemental brake pipe chamber on the opposite side of the actuating piston from the main brake pipe chamber, a quick-action chamber on the opposite side of the emergency piston from the main brake pipe chamber, a main slide valve, a graduating valve, means operatively connecting said valves to the actuating piston, an emergency valve chamber, an emergency valve in said chamber, means affording a lost-motion connection between the emergency piston and the emergency valve, a lost-motion connection between the emergency piston and the actuating piston, the main and graduating valves moving to application position upon a reduction of brake pipe pressure and being formed with ports and passages to control the admission and release of brake cylinder pressure and the emergency valve being formed with ports to locally vent the brake pipe for emergency applications of the brakes upon a sudden reduction of brake pipe pressure and adapted in emergency position to cut off communication between the main brake pipe chamber and the brake pipe, and an automatic emergency pilot valve subject to brake pipe, brake pipe reservoir and emergency reservoir pressures and operating upon a reduction of brake pipe pressure to or below a certain predetermined pressure to open and admit emergency reservoir pressure to the quick-action chamber to move the slide valves to emergency position, said valves when in emergency position admitting the emergency reservoir pressure to the brake cylinder.

33. An air brake apparatus in accordance with claim 32, the emergency pilot valve comprising a piston subject on one side to brake pipe pressure and on its other side to brake pipe reservoir pressure, a valve interposed between the emergency reservoir the brake pipe reservoir and the quick-action chamber, and a spring holding said valve closed against emergency reservoir pressure, whereby when the brake pipe and brake pipe reservoir pressures have been reduced to a predetermined degree emergency reservoir pressure will open said valve and flow to the brake pipe reservoir and to the quick-action chamber and move the slide valves to emergency position.

34. An air brake apparatus comprising a brake pipe, a brake pipe reservoir, an emergency reservoir, a triple valve formed with a main brake pipe chamber, a supplemental brake pipe chamber and a quick-action chamber, an actuating piston, an emergency piston, a main slide valve, a graduating valve, means operatively connecting said valves to the actuating piston, an emergency valve chamber, an emergency valve in said chamber, a connection between the emergency piston and the emergency valve, a connection between the emergency piston and the actuating piston, the main and graduating valves moving to application position upon a reduction in brake pipe pressure and being formed with ports and passages to control the admission and release of brake cylinder pressure and the emergency valve being formed with ports to locally vent the brake pipe for emergency applications of the brakes upon a sudden reduction of brake pipe pressure and adapted in emergency position to cut off communication between the main brake pipe chamber and the brake pipe, and an automatic emergency pilot valve subject to brake pipe, brake pipe reservoir and emergency reservoir pressures and operating upon a reduction of brake pipe pressure to or below a certain predetermined degree to open and admit emergency reservoir pressure to the quick-action chamber to move the main and graduating valves to emergency position to admit emergency reservoir pressure to the brake cylinder.

35. An air brake apparatus in accordance with claim 34, the emergency pilot valve being formed with a brake pipe chamber, a brake pipe reservoir chamber and an emergency reservoir chamber, a piston interposed between the brake pipe and the brake pipe reservoir chambers, a valve interposed between the brake pipe reservoir chamber and the emergency reservoir chamber, a stem connecting the valve to said piston, a spring surrounding said stem and seating said valve against emergency reservoir pressure, means connecting the brake pipe chamber to the brake pipe reservoir, means connecting emergency reservoir chamber with the emergency reservoir, and means connecting the brake pipe reservoir chamber to the quick-action chamber and to the main slide valve.

36. In an air brake apparatus, the combination of an emergency reservoir, a brake pipe, a brake pipe reservoir, a brake cylinder, a triple valve having means therein operating upon a reduction of brake pipe pressure to admit air to the brake cylinder and upon an increase of brake pipe pressure to release brake cylinder pressure, a manually operable release-governing valve interposed in said means and having a quick-release position and a graduated-release position, and comprising a slide valve formed with a release groove adapted to connect the brake cylinder release port to atmosphere in the quick-release position of the release-governing valve, a spring-pressed quick-release valve, means whereby the release-governing slide valve in quick-release position will open the said spring-pressed valve to permit emergency reservoir air to flow into the release-governing valve chamber, and means to permit air to flow from said release-governing valve chamber to the brake pipe upon an increase of brake pipe pressure after a service application of the brakes.

37. In an air brake apparatus, the combination of an emergency reservoir, a brake pipe, a brake pipe reservoir, a brake cylinder, a triple valve having means therein operating upon a reduction of brake pipe pressure to admit air to the brake cylinder and upon an increase of brake pipe pressure to release brake cylinder pressure, a manually operable release-governing valve interposed in said means and having a quick-release position and a graduated-release position, and comprising a slide valve formed with a release groove adapted to connect the brake cylinder release port to atmosphere in the quick-release position of the release-governing valve, a spring-pressed quick-release valve, means whereby the release-governing slide valve in quick-release position will open the said spring-pressed valve, and means to permit air to flow from said quick-release valve to the brake pipe upon an increase of brake pipe pressure after a service application of the brakes.

38. In an air brake apparatus, the combination of an emergency reservoir, a brake pipe, a brake pipe reservoir, a brake cylinder, a triple valve having means therein operating upon a reduction of brake pipe pressure to admit air to the brake cylinder and upon an increase of brake pipe pressure to release brake cylinder pressure, a manually operable release-governing valve interposed in said means and having a quick-release position and a graduated-release position, and comprising a slide valve formed with a release groove adapted to connect the brake cylinder release port to atmosphere in the quick-release position of the release-governing valve, a quick-release valve arranged to be closed when the release-governing valve is in graduated-release position, a quick-release lever engaging said quick-release valve and adapted to be moved by the release-governing slide valve to open the quick-release valve when the said slide valve is in quick-release position, and means to permit air to flow from said quick-release valve to the brake pipe upon an increase of brake pipe pressure after a service application of the brakes.

39. In an air brake apparatus, the combination of a brake pipe, a brake cylinder, a brake pipe reservoir, an emergency reservoir, and a triple valve comprising a casing having main and supplemental brake pipe pressure chambers and a quick-action chamber, a main valve device, an emergency valve, a main piston connected with the main valve device normally balanced between the pressures in the brake pipe chambers, an emergency piston connected with the emergency valve and the main piston subject on opposite sides to the pressures in the main brake pipe chamber and the quick-action chamber and operable by the pressure in the quick-action chamber upon an emergency reduction in brake pipe pressure to move the main piston and the main and emergency valves to open a direct communication between the emergency reservoir and brake cylinder and to close communication between the main brake pipe chamber and the brake pipe, an emergency pilot valve normally closing communication between the emergency reservoir the main valve device and the quick-action chamber and subject to brake pipe, brake pipe reservoir and emergency reservoir pressures, a spring normally seating said valve against emergency reservoir pressure, brake pipe pressure assisting said spring in holding said valve closed, whereby upon a reduction of brake pipe pressure below a predetermined degree the emergency reservoir pressure will open the emergency pilot valve and flow to the main valve device and to the quick-action chamber, and means in the main valve device to permit emergency reservoir air to flow to the brake cylinder when said valve device is in emergency position.

40. An air brake apparatus comprising a brake pipe, a brake pipe reservoir, an emergency reservoir, a triple valve formed with a main brake pipe chamber having extensions of different diameters, an actuating piston in the inner smaller extension, a larger emergency piston in the outer larger extension, a supplemental brake pipe chamber on the opposite side of the actuating piston from the main brake pipe chamber, a quick-action chamber on the opposite side of the emergency piston from the main brake pipe chamber, a main slide valve, a graduating valve, means operatively connecting said valves to the actuating piston, an emergency valve chamber, an emergency valve in said chamber, means affording a lost-motion connection between the emergency piston and the emergency valve, a lost-motion connection between the emergency piston and the actuating piston, the main and graduating valves moving to application position upon a reduction of brake pipe pressure and being formed with ports and passages to control the admission and release of brake cylinder pressure and the emergency valve being formed with ports to locally vent the brake pipe for emergency applications of the brakes upon a sudden reduction of brake pipe pressure and adapted in emergency position to cut off communication between the main brake pipe chamber and the brake pipe, a pilot valve operated by brake cylinder, brake pipe and emergency reservoir pressures and controlling the operation of the main and graduating valves in service applications and for a slow release of brake cylinder pressure, a release-governing valve controlling the release of brake cylinder pressure through the main slide valve, an emergency pilot valve wholly controlling the flow of emergency reservoir air to the main slide valve and the quick-action chamber for emergency applications of the brakes, and means to hold said emergency pilot valve closed until the brake pipe pressure has been reduced to a predetermined degree.

41. In an air brake apparatus, the combination of a brake pipe, a brake cylinder, a brake pipe reservoir, an emergency reservoir, and a triple valve comprising a casing having main and supplemental brake pipe pressure chambers and a quick-action chamber, a main valve device, an emergency valve, a main piston connected with the main valve device normally balanced between the pressures in the brake pipe chambers, an emergency piston connected with the emergency valve and the main piston subject on opposite sides to the pressures in the main brake pipe chamber and the quick-action chamber and operable by the pressure in the quick-action chamber upon an emergency reduction in brake pipe pressure to move the main piston and the main and emergency valves to open a direct communication between the emergency reservoir and brake cylinder and to close communication between the main brake pipe chamber and the brake pipe, a pilot valve operated by brake pipe, brake cylinder and emergency reservoir pressures and wholly controlling the operation of the main valve device in service applications of the brakes and for a slow release of brake cylinder pressure, a manually adjustable release-governing valve wholly controlling the quick release of brake cylinder pressure through the main valve device, and an emergency pilot valve wholly controlling the flow of emergency reservoir air to the main valve device and to the quick-action chamber in emergency applications of the brakes.

42. A triple valve for air brake apparatus comprising a main slide valve device, means operated by variations in brake pipe pressure to move said main valve device to service application position, emergency application position and to release position, a pilot valve operated by varying brake pipe pressure and controlling the operation of the main slide valve device to service application position and also controlling the slow release of brake cylinder pressure, a manually operable release-governing valve controlling the release of brake cylinder pressure through the main valve device, and an emergency pilot valve wholly controlling the flow of emergency braking pressure to the main valve device for emergency applications of the brakes and operable upon a reduction of brake pipe pressure to a predetermined degree.

In testimony whereof I hereunto affix my signature.

SPENCER GEARY NEAL.